(12) United States Patent
Morgenstern

(10) Patent No.: US 7,546,977 B2
(45) Date of Patent: Jun. 16, 2009

(54) PASSIVE AERODYNAMIC SONIC BOOM SUPPRESSION FOR SUPERSONIC AIRCRAFT

(75) Inventor: John M. Morgenstern, Lancaster, CA (US)

(73) Assignee: Lockheed-Martin Corporation, Rockledge, MD (US)

( * ) Notice: Subject to any disclaimer, the term of this patent is extended or adjusted under 35 U.S.C. 154(b) by 638 days.

(21) Appl. No.: 11/238,203

(22) Filed: Sep. 28, 2005

(65) Prior Publication Data

US 2007/0252028 A1 Nov. 1, 2007

Related U.S. Application Data

(63) Continuation-in-part of application No. 10/614,393, filed on Jul. 3, 2003, now Pat. No. 6,959,896.

(51) Int. Cl.
*B64C 30/00* (2006.01)
(52) U.S. Cl. ..................... 244/35 A; 244/1 N
(58) Field of Classification Search .............. 244/1 N, 244/35 A, 35 R, 53, 55, 34 A, 36
See application file for complete search history.

(56) References Cited

U.S. PATENT DOCUMENTS

| 4,655,412 | A | * | 4/1987 | Hinkleman | 244/35 R |
| 4,718,619 | A | * | 1/1988 | Ashill et al. | 244/35 R |
| 6,959,896 | B2 | * | 11/2005 | Hartmann et al. | 244/35 A |

* cited by examiner

*Primary Examiner*—Timothy D Collins
(74) *Attorney, Agent, or Firm*—Koestner Bertani LLP; Mary Jo Bertani

(57) ABSTRACT

An aircraft capable of supersonic flight comprises a body portion including a fuselage, a wing, and an engine nacelle mounted below the wing. The aircraft may also include a high-mounted aft, tail. The area/lift distribution of the body portion is tailored to reduce sonic boom disturbance. The body portion further includes a blunt nose and a gull dihedral wing configuration that further reduces sonic boom disturbance and eases constraints on area/lift distribution tailoring. The gull dihedral wing or tail is configured to carry lifting force to its trailing edge to create an expansion at the aft end of the aircraft that reduces aft sonic boom ground shock strength. The volume of the mid-portion of the fuselage can be reduced above the wing to create a sloped surface that generates an expansion fan over the wings. The expansion fan lowers the pressure above the wing in the area covered by the expansion to reduce the pressure required on the upper and lower surfaces of the wing to generate the same lifting force.

24 Claims, 22 Drawing Sheets

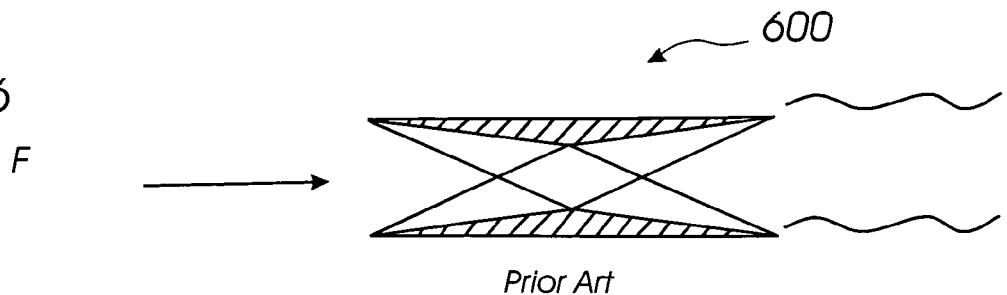
FIG. 6 — Prior Art
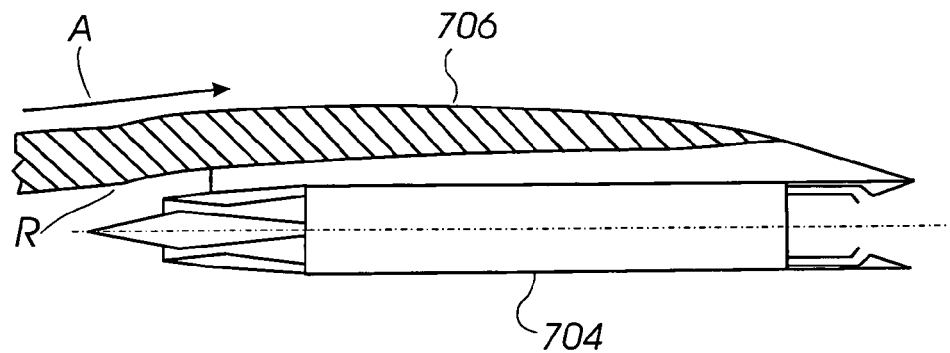
FIG. 7A
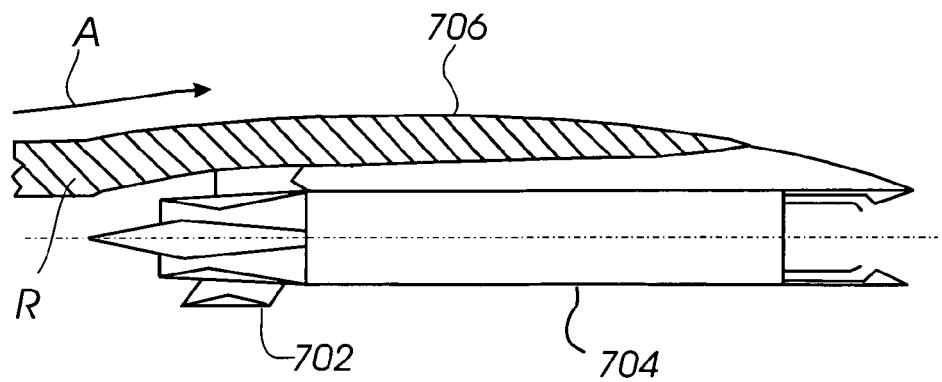
FIG. 7B
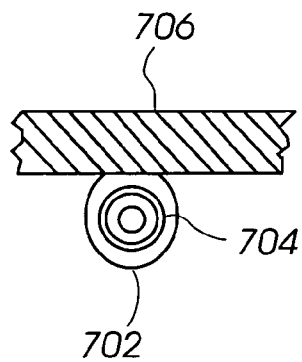
FIG. 7C

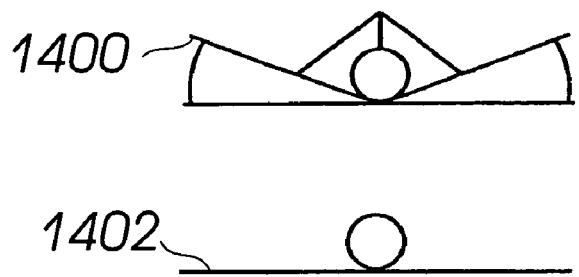
FIG. 14A
FIG. 14C
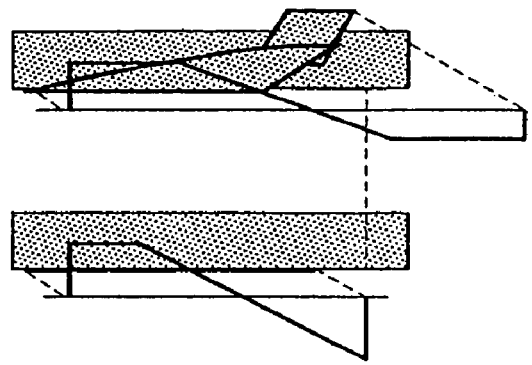
FIG. 14B
FIG. 14D

PASSIVE AERODYNAMIC SONIC BOOM SUPPRESSION FOR SUPERSONIC AIRCRAFT

DESCRIPTION OF THE RELATED ART

When an object such as an airplane travels through air, the movement of the plane causes a pressure disturbance that moves at the speed of sound. By way of example, the sound waves created by the nose of the plane will travel in an outward direction away from the aircraft. When traveling subsonically, the air ahead of the plane receives the sound waves before the arrival of the aircraft, so that when the aircraft arrives, the air is already moving out of the way and around the plane. As the airplane approaches the speed of sound, the sound waves compress closer and closer together at the front of the plane. When the aircraft is moving at the speed of sound the sound waves merge together into a "shock wave" which is an almost instantaneous line of change in pressure, temperature and density.

As shown in FIG. 1, an aircraft traveling at supersonic speed will generally generate a bow shock wave from the nose and wing of the airplane and a tail shock wave created by the portion of the plane behind the wing. The tail shock wave is created by an under pressurization in the air typically from the wing trailing edge and portions behind. The overall shock wave pressure gradient extends from an over-pressure area beneath the forward to middle portion of the plane and an under-pressure area beneath the aft section of the aircraft, as shown in FIG. 1. Pressure disturbances coalesce into an N-wave shape that has the largest shock magnitudes at the inflection points 102, 104 of the pressure gradient curve. Since the front of a supersonic aircraft generates an increase in ambient pressure, and the rear generates a decrease in pressure, a corresponding variation in propagation speed causes aircraft pressure disturbances to stretch out as they propagate to the ground. As the disturbances stretch out, they also tend to coalesce because shock waves travel only halfway between the speed of the lower pressure ahead and higher pressure behind them.

The shock waves travel through the atmosphere to the ground. To an observer, the shock waves are felt as an abrupt pressure compression, followed by a gradual pressure decompression and a final abrupt recompression to ambient pressure. The two abrupt changes in pressure create a disturbingly loud double boom sound. Additionally, the shock waves slightly shake surrounding buildings and can cause objects inside to rattle. For these reasons supersonic transports (SST) have been limited to routes that do not carry the plane across or near land. SSTs are therefore restricted to flights across water, thereby limiting the usefulness of the planes. It is desirable to reduce the unacceptable loudness of sonic boom from shock waves created by supersonic aircraft.

SUMMARY

In some embodiments, an aircraft capable of supersonic flight comprises a body portion including a relaxed bluntness nose, a fuselage, a wing including a trailing edge, and an engine nacelle mounted below the wing. The body portion is configured with an area/lift distribution tailored to reduce sonic boom disturbance. A propulsion system on the aircraft is capable of generating a non-axisymmetric pressure disturbance that impacts lift and/or trim surfaces. The lift and/or trim surfaces include camber line and thickness slopes configured to define a reflex portion that cancels more than half of the pressure disturbance.

In other embodiments, a supersonic cruise aircraft includes a body and a lifting surface mounted on the body. The lifting surface includes a trailing edge and a cross-section with a point of maximum thickness between an upper surface and a lower surface. The upper surface is configured with a substantially straight line from the point of maximum thickness to the trailing edge, and the lower surface includes a reflex portion extending from the point of maximum thickness to the trailing edge. Further, the aircraft is configured according to a lengthwise lift/area distribution curve that enables the aircraft to produce a shaped sonic boom in accordance with a minimized equivalent area distribution curve.

In still other embodiments, an aircraft capable of supersonic flight, includes a fuselage, a wing, an engine nacelle, and a high-mounted lifting aft tail. The fuselage and wing are configured according to a tailored area/lift distribution curve including a relaxed bluntness nose that reduces sonic boom disturbance, and the tail is configured to carry lifting force to the trailing edge of the aircraft to create an expansion at the trailing edge of the tail that reduces the aft sonic boom ground shock strength.

BRIEF DESCRIPTION OF THE DRAWINGS

FIG. 6 shows a prior art diagram of shock wave cancellation between two parallel plates.

FIGS. 7A through 7C illustrate an embodiment of an engine mounted beneath a reflexed aircraft wing to reduce sonic boom disturbances.

FIG. 14A is a schematic front view of a tail-braced dihedral wing aircraft.

FIG. 14B illustrates non-planar low sonic boom advantages for the aircraft of FIG. 14A.

FIG. 14C is a schematic front view of a planar wing aircraft.

FIG. 14D illustrates a higher magnitude and shorter duration sonic boom profile for the aircraft of FIG. 14C with a planar wing.

DETAILED DESCRIPTION OF THE INVENTION

The following description is provided to enable any person skilled in the art to make and use various embodiments of the invention, and sets forth the best modes contemplated by the inventor of carrying out the various embodiments disclosed.

Various embodiments disclosed herein use a combination of synergistic techniques to achieve reduction of the sonic boom from supersonic airplanes. A reduction of noise from sonic booms by at least 15-25 decibels is achieved while reducing the drag of a reduced boom vehicle and maintaining a practical design.

Figure 1:
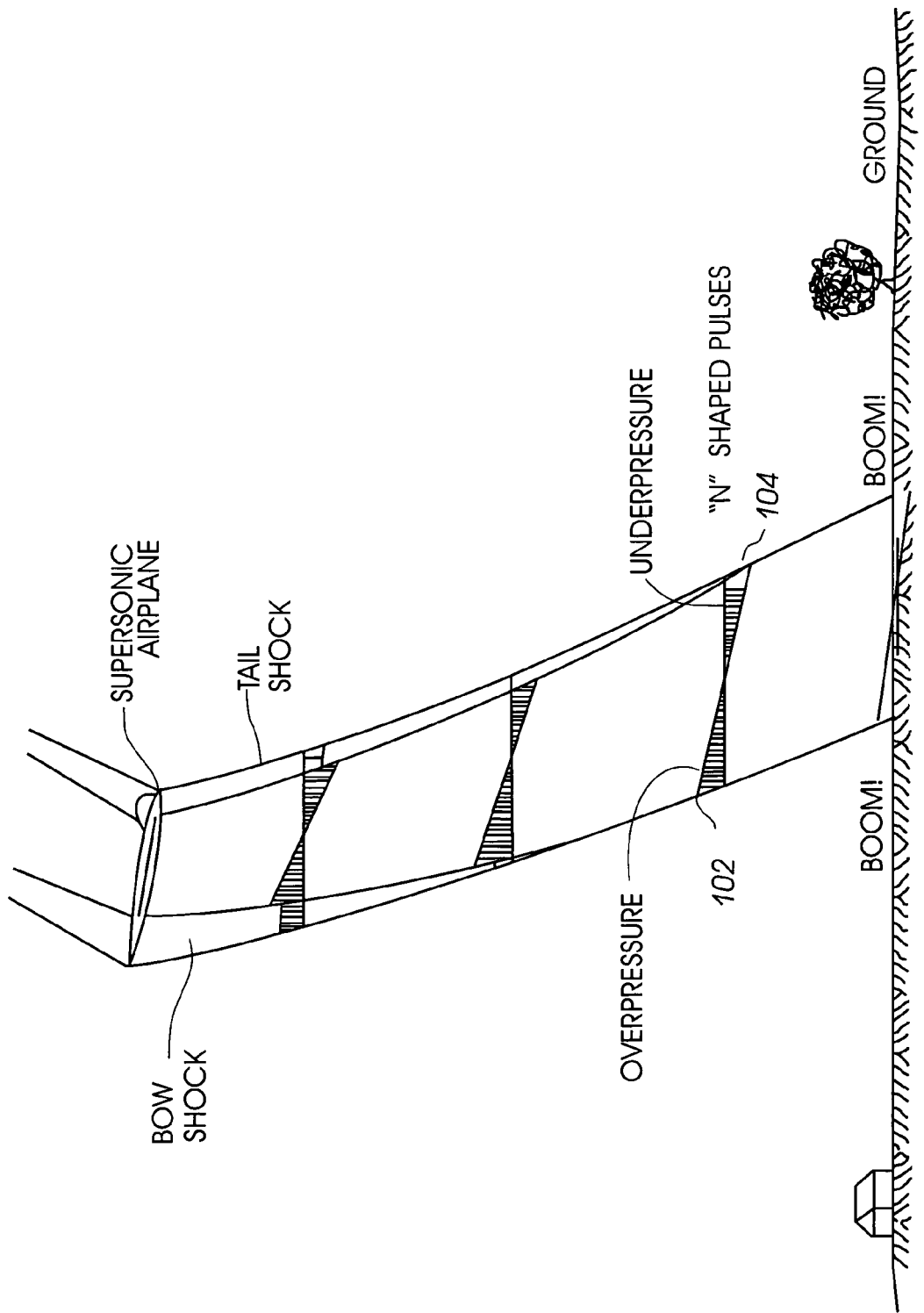
FIG. 1 is an illustration of shock waves created when an aircraft travels faster than the speed of sound.
Figure 2A:
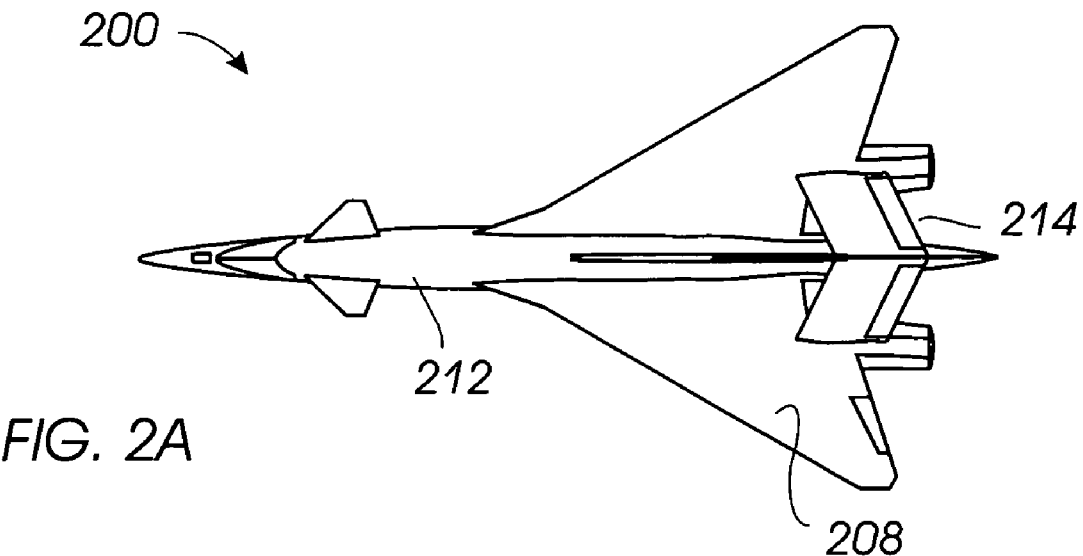
FIGS. 2A through 2C illustrate an embodiment of an aircraft configured with various features to minimize sonic boom disturbances.
Figure 2B:
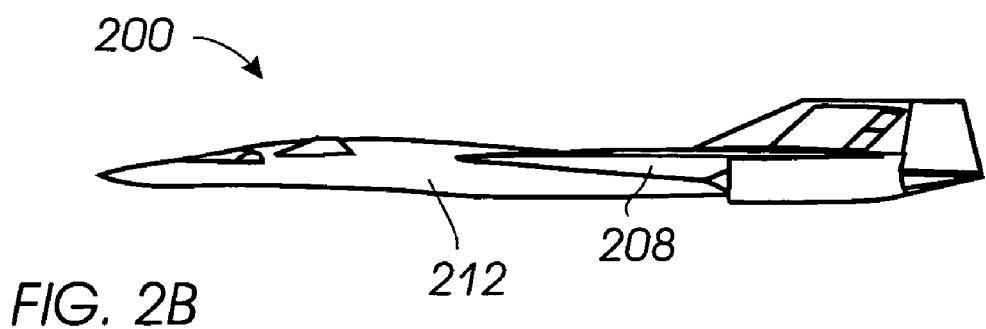
Figure 2C:
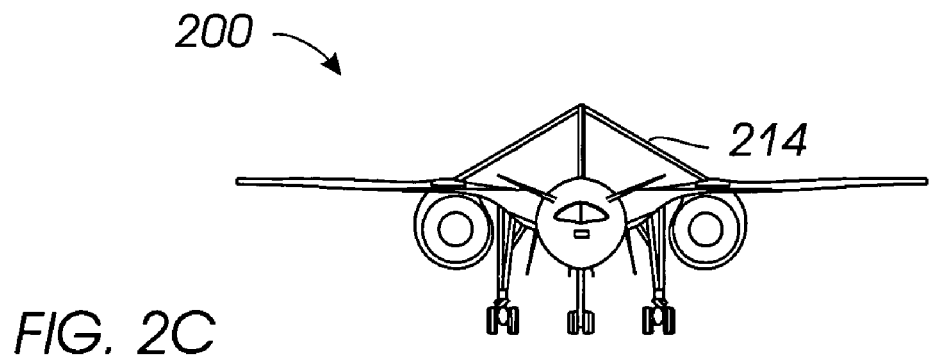
Figure 2D:
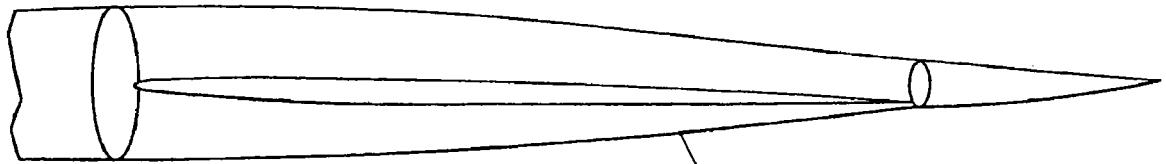
FIGS. 2D through 2F illustrate an embodiment of a tail and fuselage portion for the aircraft of FIG. 2A.

FIGS. 2A through 2C illustrate an embodiment of an aircraft 200 configured to minimize sonic boom disturbances. Aircraft 200 includes features that compress the pressure at the nose, expand pressure at the tail, and constrain the pressures between the nose and tail to weak compressions and expansions to prevent the pressure waves from coalescing. As a result, aircraft 200 can fly at supersonic speeds with significantly reduced sonic boom disturbances, as further described herein.

Area and Lift Distribution Tailoring to Minimize Sonic Boom

In a technical paper entitled "Sonic-Boom Minimization" published in the Journal of the Acoustical Society of America, Vol. 51, No. 2, Pt. 3, February 1972, pp. 686-694, the authors A. R. George and Richard Seebass developed the theory for tailoring the area and lift distribution versus aircraft length to minimize the shock strength at the ground given parameters of aircraft weight, flight altitude and Mach number. Traditionally, it was believed that to minimize the shock strength, the sum of the area and lift must exactly follow the George and Seebass distribution. Minimizing shock strength In "Sonic-Boom Minimization with Nose Bluntness Relaxation," published as NASA TP-1348, 1979, Darden added a shape for a relaxed bluntness nose that reduced bluntness drag greatly with a slight increase in boom.

Aircraft configured according to George-Seebass-Darden's theory for shock minimized distributions are impractical designs because the distributions require:

1. either blunt noses or relaxed bluntness noses whose shapes result in higher drag than minimum drag shapes, which lead to reduced performance;
2. smooth distributions through the engine nacelle region, which is not possible with existing engine designs;
3. a one-dimensional simplifying assumption so the distributions are only calculated directly under the vehicle, which means that non-planar and azimuthally varying effects are not considered; and
4. an expansion behind the aft end of the vehicle to keep the aft shock from coalescing, contrary to a minimum wave drag shape which compresses the flow field for about the last quarter of the vehicle's length.

Additional techniques are therefore desired to suppress all shock sources of a realistic vehicle.

Achieving a minimized equivalent area distribution is difficult because so many other vehicle requirements are impacted anytime the area or lift distributions are changed. It is extremely computationally intensive to arrive at a design that meets all the constraints and requirements with optimum performance. A more feasible low boom design capability is only possible by using a more flexible sonic boom minimization constraint. The following extensions to sonic boom minimization theory help achieve the desired flexibility in the sonic boom minimization constraint, with the result of arriving at feasible supersonic aircraft designs with optimum performance, where previously performance was degraded much more to achieve sonic boom minimization or minimization was not even possible.

The zero-lift wave drag on aircraft 200 is proportional to the integral of the second derivative of cross-sectional area times the square of the maximum cross-sectional area of all components of aircraft 200. To minimize the wave drag due to the second derivative of cross-sectional area, the area must follow a smooth bell curve shape known as a Sears-Haack body. For example, a smooth overall vehicle cross-sectional area in the vicinity of wing 208 is more significant in reducing wave drag than a smooth fuselage 212 area with the overall area less smooth. Wave drag is minimized when rate-of-change in cross-sectional area, and the maximum cross-sectional area, are minimized. To reduce second derivative variations and the maximum cross-sectional area, the volume of fuselage 212 is correspondingly reduced in the vicinity of wing 208 and tail 214, so that there are no discontinuities in the cross-sectional area distribution of the overall aircraft 200.

Figure 2G:
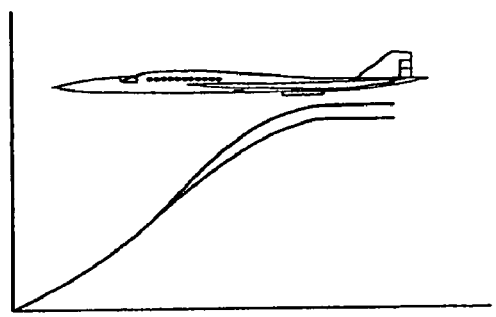
FIG. 2G shows equivalent area distribution curves for an embodiment of an aircraft with reduced fuselage section above the wing compared to an unreduced fuselage.
Figure 2E:
Figure 2F:
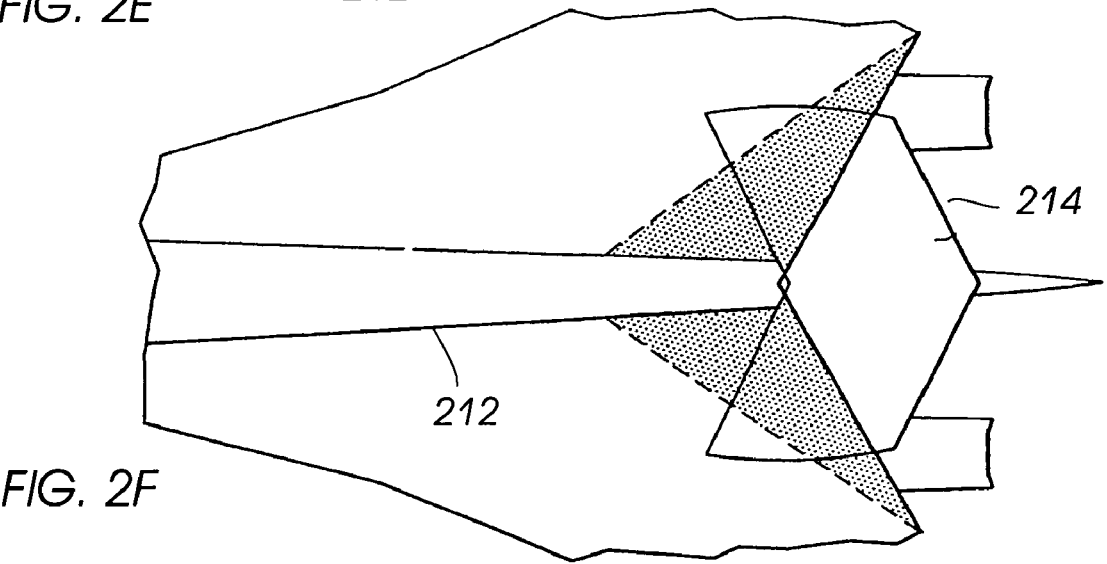
Figure 2H:
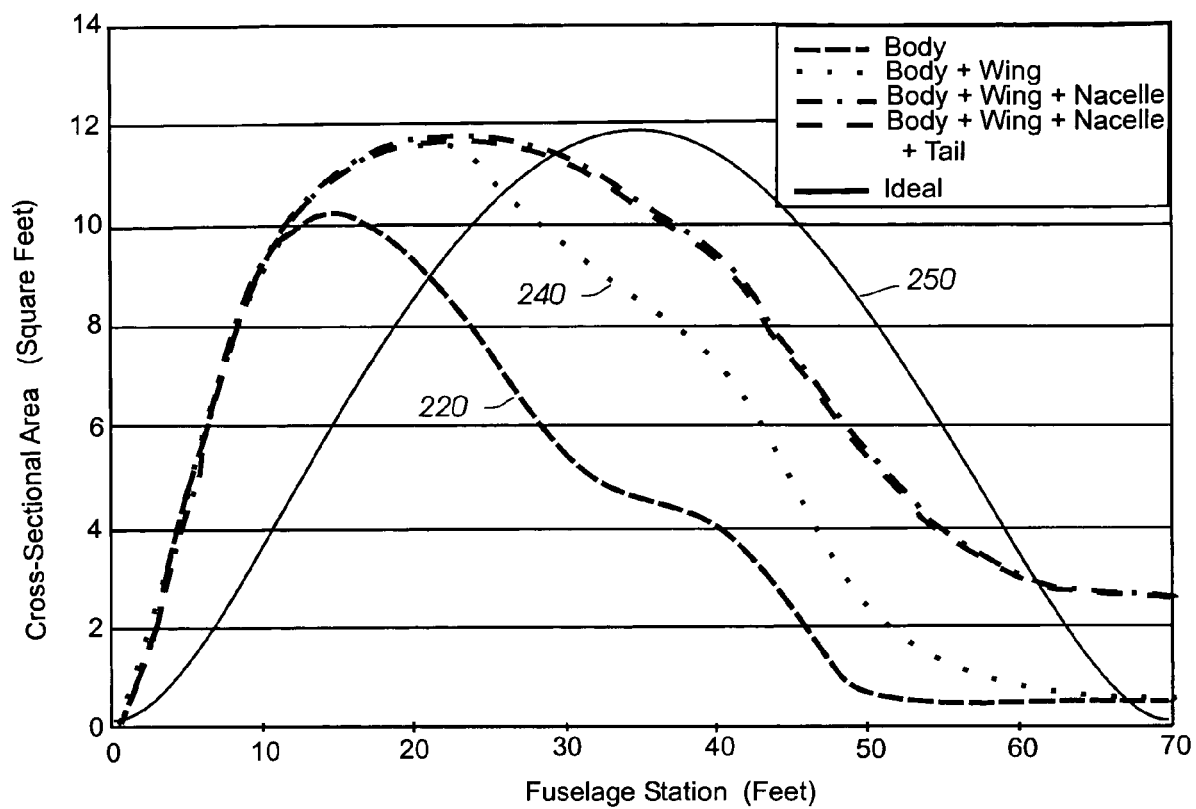
FIG. 2H shows the difference in cross-sectional area for a complete vehicle with wake and exhaust plus an aircraft body area-ruled for complete vehicle minimum drag with its maximum cross-sectional area constrained at 30% of vehicle length plotted with a more classic Sears-Haack area-ruled body shape with its maximum cross-sectional area constrained at 50% of vehicle length.

FIG. 2H shows the difference in cross-sectional area for a complete vehicle with wake and exhaust, curve 240, plus an aircraft body area-ruled for complete vehicle minimum drag with its maximum cross-sectional area constrained at 30% of vehicle length, curve 230, plotted with a more classic Sears-Haack area-ruled body shape with its maximum cross-sectional area constrained at 50% of vehicle length, curve 250. Sears-Haack minimum drag area distributions can be determined for any combination of components, cross-sectional areas and area locations.

Artificially Blunt Leading Edges (ABLE)

Figure 3A:
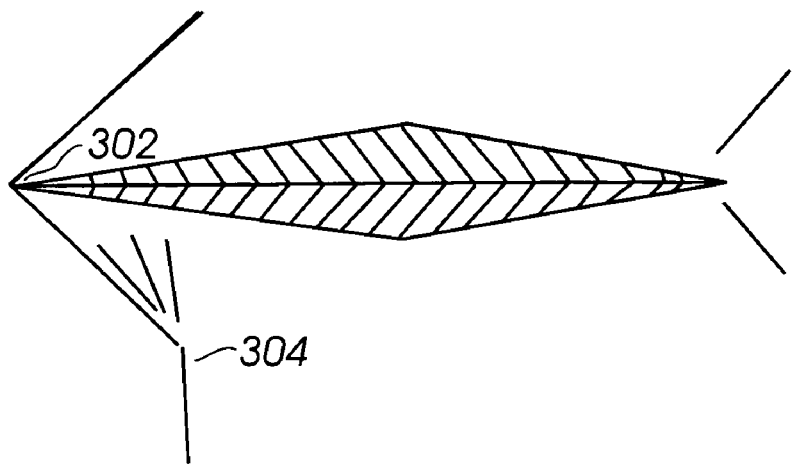
FIGS. 3A and 3B illustrate leading edge configurations and resultant shock formations.
Figure 3B:
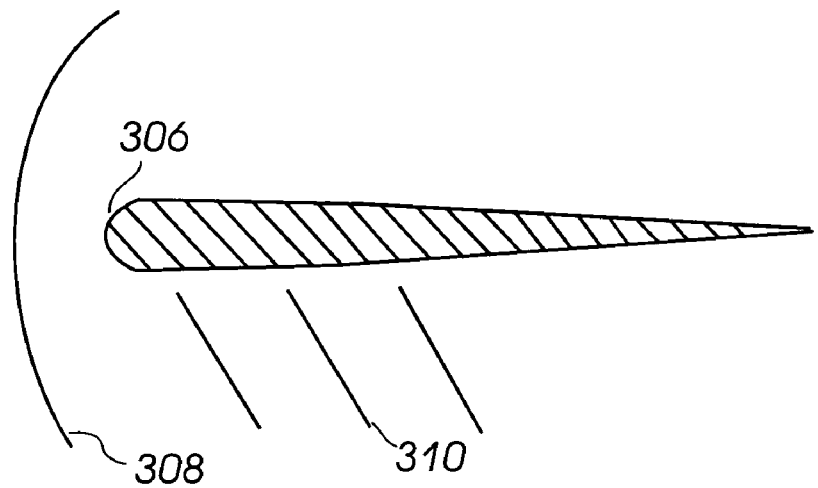
Figure 3D:
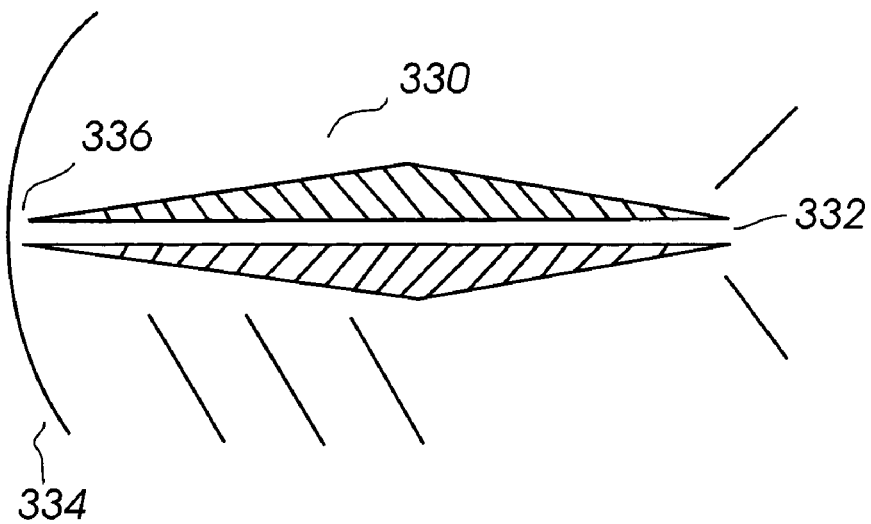
FIG. 3D shows a leading edge configuration with channels and resultant shock formations.
Figure 3C:
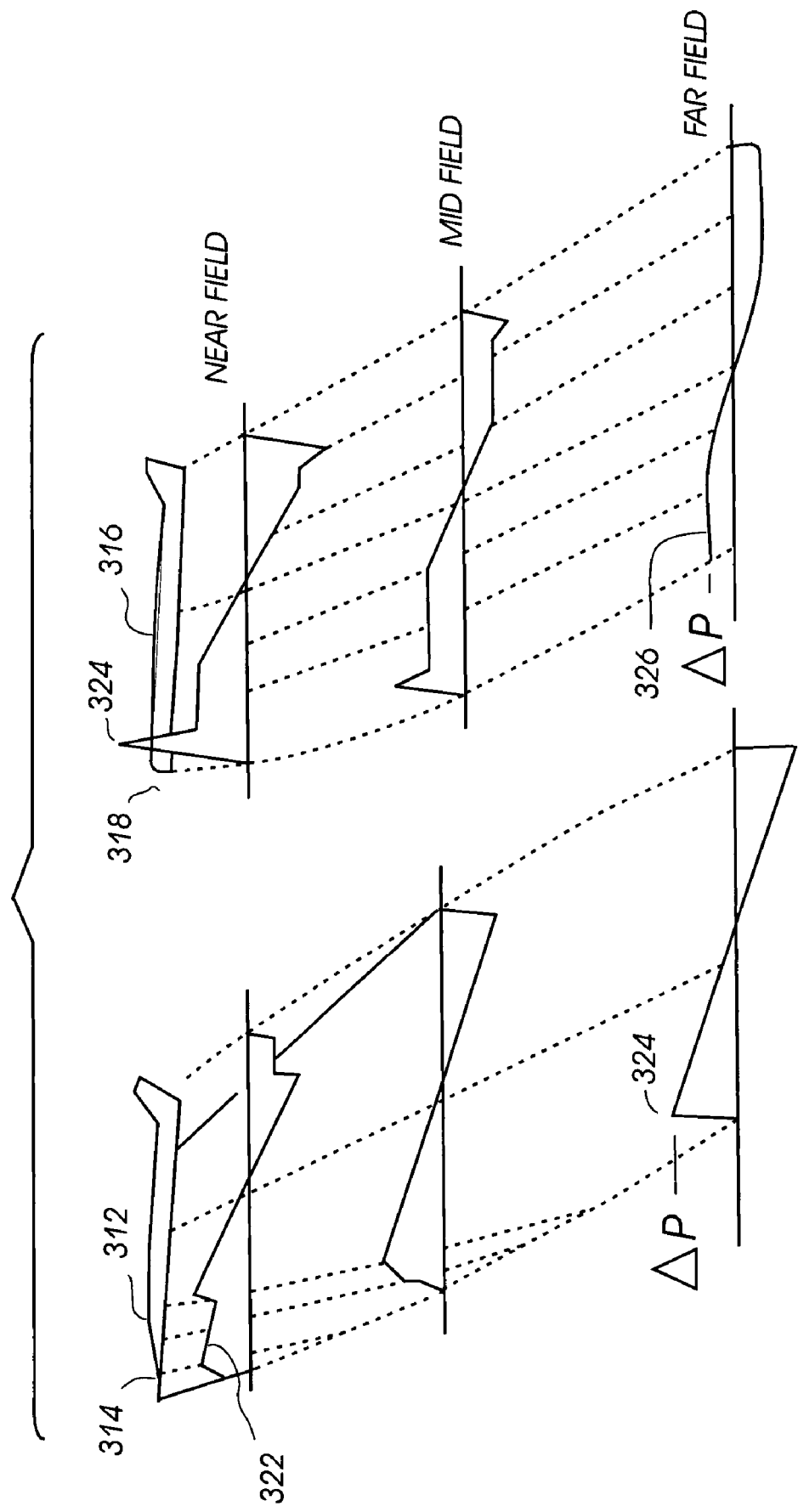
FIG. 3C illustrates leading edge configurations and resultant shock formations.

The nose is a critical region for sonic boom minimization. Referring now to FIGS. 3A through 3F, sharp leading edges 302 on an aircraft generate strong compressions 304 as indicated in FIG. 3A that coalesce to produce a strong far-field overpressure. Contrary to intuition, boom minimization requires a relatively strong nose shock resulting from a blunt nose, which can lead to higher drag. A blunt leading edge 306 creates a strong bow shock 308 as indicated in FIG. 3B, but subsequent compressions 310 are weak and less likely to coalesce. In addition, the dissipation with altitude of strong initial shocks is greater. High wave drag of blunt edges or noses has traditionally precluded practical applications, and has been described as the "low boom, high drag" paradox. FIG. 3C shows diagrams comparing near-field, mid-field, and far-field pressure wave signatures of aircraft 312 configured with a sharp nose 314, and aircraft 318 with a blunt nose 320. While near-field pressure wave signature 322 at nose 314 of aircraft 312 is smaller in magnitude, the pressure waves coalesce to produce a strong far-field pressure wave. In contrast, although blunt-nose 318 of aircraft 316 causes a large spike in the near-field pressure wave signature 324, the far-field pressure wave signature 326 is greatly reduced compared to the far-field pressure wave signature of aircraft 312.

To address this phenomenon, "slotted edge" technology can be used to significantly reduce drag associated with blunt-nose/blunt-edges, as well as far-field overpressure of leading edge shocks. A cross-sectional diagram of an embodiment of a slotted airfoil 330 is shown in FIG. 3D. When flow becomes choked in channel 332, a strong normal shock 334 is induced in front of leading edge 336. The pressure and friction drag of the resultant flow pattern of slotted airfoil 330 is significantly lower than conventional airfoil leading edge 306 (FIG. 3B). Computational Fluid Dynamics analysis has shown up to 40% reduction in drag relative to a solid blunt airfoil.

Figure 3E:
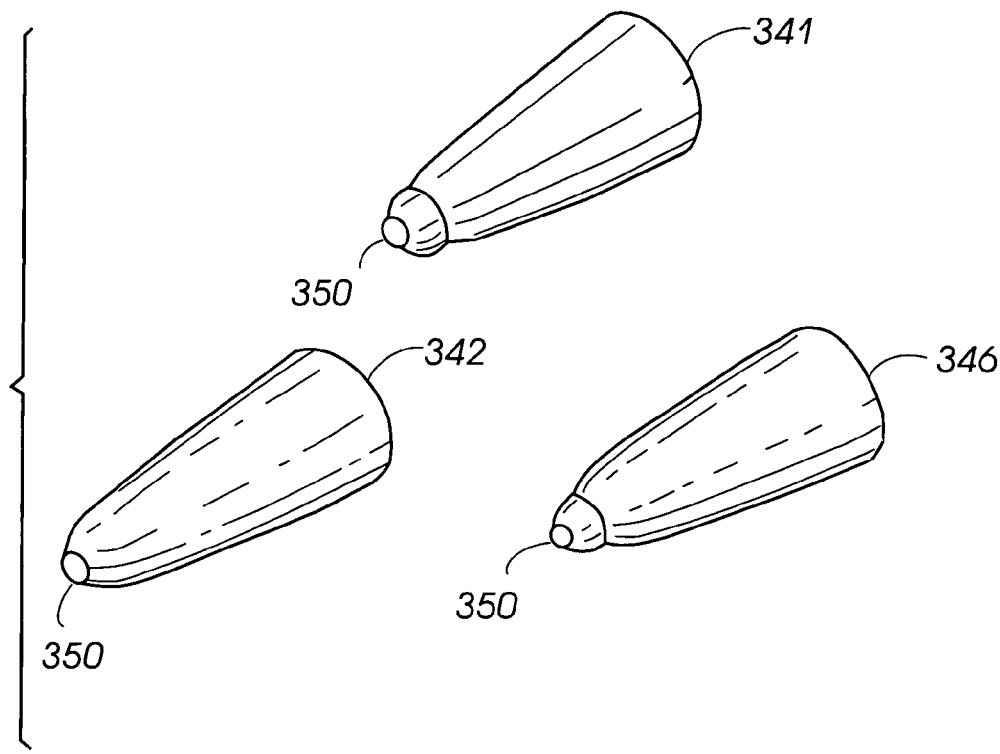
FIGS. 3E and 3F illustrate multiple Artificially Blunt Leading Edge (ABLE) nose configurations designed for a representative low boom tailored aircraft.
Figure 3F:
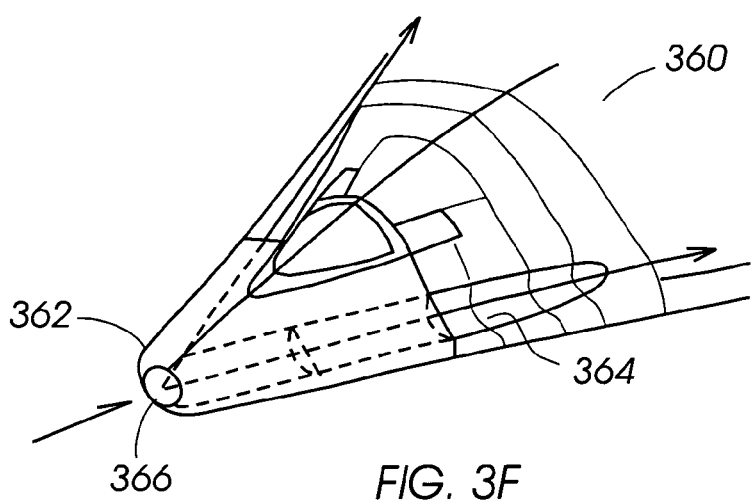

Another method of incorporating slotted edge technology on an aircraft includes attaching one of blunt noses 342, 344, 346 to the aircraft, as shown in FIG. 3E. A normal shock inlet 350 is placed at tip of noses 342, 344, 346 to generate a strong shock with less drag because the flow enters inlet 350 and finds an outlet through slots around the nose of the aircraft instead of stagnating, as occurs with conventional blunt nose aircraft. Noses 342, 344, 346 can be fastened to an aircraft in any suitable manner. As a result, blunt noses 342, 344, 348 with inlet 350 have lower drag while providing the bluntness desired in a tailored body distribution to minimize the rate of change of differences in cross-sectional area of the aircraft. FIG. 3F shows an embodiment of aircraft 360 with a flying wing configuration that incorporates blunt nose 362 and channels 364 to provide an outlet for flow through inlet 366.

A given lift distribution can be converted into a corresponding equivalent area distribution using the following equation:

$$A_e = [\int L dx]/(x-x_o)^{1/2}$$

where: $A_e$ = equivalent area
L = Lift per unit measurement
x = distance along longitudinal axis Equivalent area curves can be used to calculate non-dimensionalized functions of the change in pressure divided by total pressure, also referred to as an F-function, along the effective length of the aircraft.

Darden introduced a Mach angle length (YF) over which the nose bluntness can be relaxed to reduce the drag from the strong nose shock required to minimize sonic boom. The formulation assumed a continuous, linearly increasing F-function for the first half of the nose bluntness relaxation length (YF/2), followed by a linearly decreasing F-function for the second half of the Mach angle length. Accordingly, another method for configuring an aircraft for low sonic boom and low drag can include a minimum wave drag area distribution in the bluntness region (<YF) followed by constraints to the equivalent area distribution needed to achieve a conventional F-function behind the bluntness region (>YF). In practice, the equivalent area distribution of a conventional F-function can be used as a constraint outside the bluntness region and will yield an F-function with very slightly lower pressure (and corresponding lower boom disturbance).

Figure 4A:
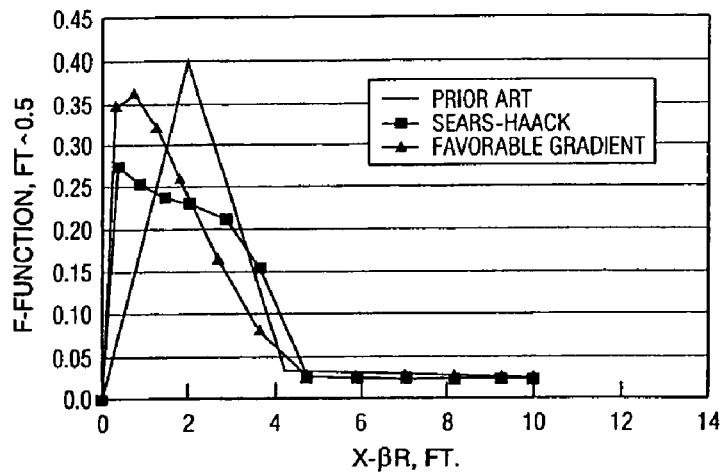
FIGS. 4A-C show an example of results achieved using a Sears-Haack minimum wave drag area distribution in the bluntness region (<YF) or a favorable surface pressure gradient (conducive to reduced friction drag laminar boundary layer) followed by constraints to the equivalent area distribution needed to achieve a conventional F-function with the required bluntness impulse but a modified bluntness shape.
Figure 4B:
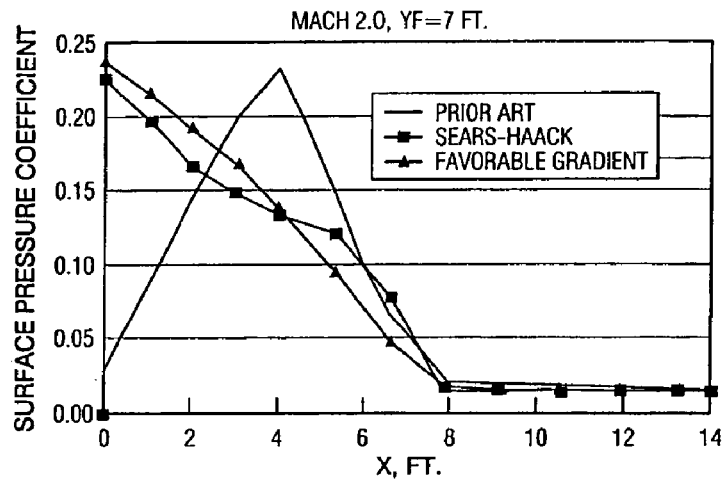
Figure 4C:
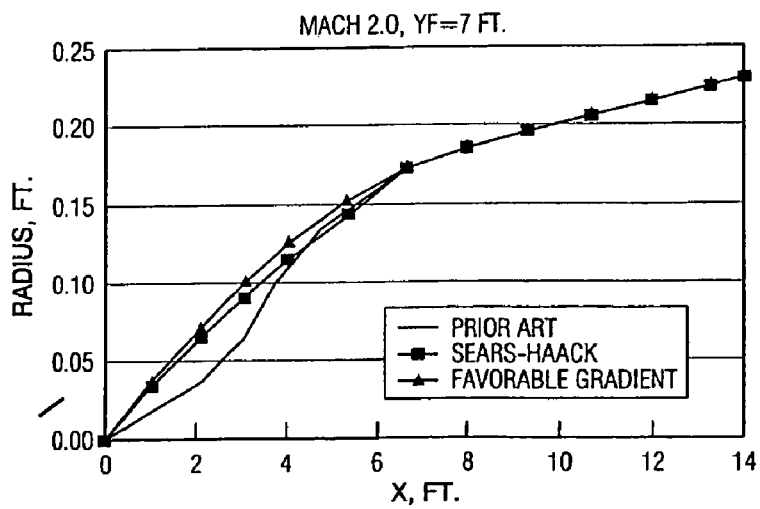

An example of results achieved using a Sears-Haack minimum wave drag area distribution in the bluntness region (<YF) followed by constraints to the equivalent area distribution needed to achieve a conventional F-function is illustrated in FIGS. 4A-C. The minimized drag curve, labeled Sears-Haack, has a slightly sloped F-function strength, a favorable pressure gradient (most favorable at the aft end of the relaxation length YF) and a blunter nose curvature without inflection. Further, it is 19% lower in wave drag than the prior art curve.

Another optional configuration includes a nose with a constant favorable pressure gradient as labeled in FIGS. 4A-C. This shape of the favorable gradient curve has even greater nose bluntness and volume with still 15% lower wave drag than the prior art shown. Further the strong favorable pressure gradients from integrating boom minimization with either the 'minimum drag' or 'favorable gradient' nose shapes can be made to yield significant runs of laminar flow, further offsetting the low sonic boom bluntness drag with reduced skin friction drag. These alternate relaxed bluntness shapes can also produce minimum drag at shorter bluntness relaxation lengths, leading to lower minimized boom shock strengths.

An embodiment of a nose shape corresponds to a minimum wave drag Sears-Haack shape connecting the nose to the rest of the boom minimized equivalent area distribution. Another embodiment of a nose shape corresponds to a near constant favorable gradient pressure (linearly decreasing pressure) minimum wave drag Sears-Haack shape connecting the nose to the rest of the boom minimized equivalent area distribution.

Figure 5A:
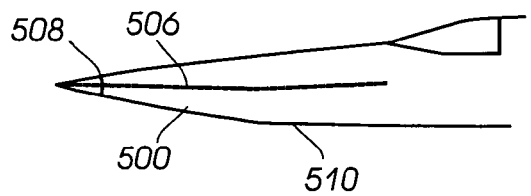
FIG. 5A shows an embodiment of an upper nose surface with minimum drag shape, lower nose surface with bluntness and end of bluntness rapid slope change necessary for sonic boom minimization and lower drag than nose configurations that are blunt on upper and lower surfaces.
Figure 5B:
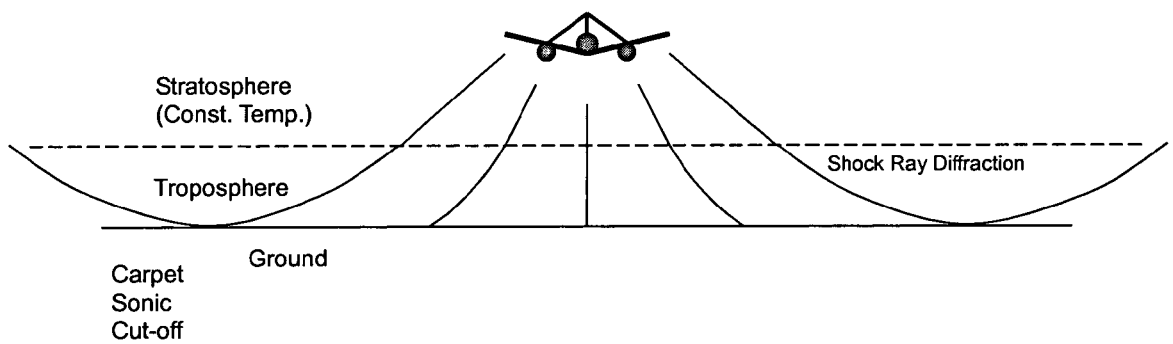
FIG. 5B shows the limited azimuthal angular extent of (typically +/−50 degrees from directly below) pressures below the vehicle that form the primary boom carpet intersection with the ground.

FIG. 5A is a side view of a portion of an aircraft including a cambered blunt nose 500 with a relaxed bluntness minimum drag or favorable gradient shape on the underside and defines a camber line 506 that slopes upward toward the front of the aircraft. This design slightly reduces the overall bluntness angle 508 required for minimized sonic boom and especially reduces the bluntness angle on the upper nose surface. Perhaps even more effective for lowering drag, nose 500 rapidly expands the bluntness compression spike to the much weaker ramp compression at 510, as shown for example in FIGS. 4A-C, without the need for a strong, drag increasing, nose upper surface slope change. The nose bluntness drag is less because the bluntness is only generated fully for pressures below the vehicle that form the primary boom carpet intersection with the ground as shown in FIG. 5B. The carpet pattern is limited to about +/−50 degrees from directly below the aircraft because temperature increases at lower altitudes diffract sonic boom rays, limiting the azimuths of rays that primarily intersect with the ground.

Figure 5C:
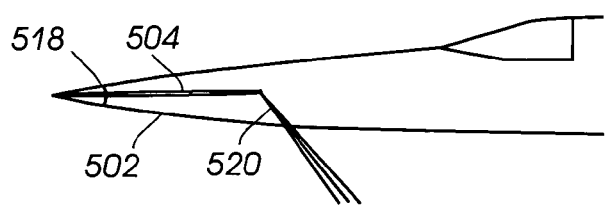
FIG. 5C is a side view of a portion of an aircraft including a blunt nose and canard with minimum drag shape above the canard and half of the minimized nose bluntness below, for low drag and minimized boom in accordance with an embodiment of the present invention.

Another way to reduce the drag associated with the nose bluntness is to only produce the strong shock below the vehicle. FIG. 5C is a side view of a portion of an aircraft blunt nose 502 and canard 504 in the YF region with minimum drag shape above the canard and one-half the nose bluntness area below, for low drag and minimized boom. Only the nose 502 below the canard 504 needs to maintain half of the bluntness area. The area above the canard 504 can be distributed for minimum drag. Additionally, there is drag associated with the rapid decrease in pressure from the nose shock to the weak compression that follows. The canard 504 trailing edge naturally forms such an expansion 520 without the need to as rapidly inflect the area distribution. Even the halved bluntness area below the canard 504 is greater than the minimum drag area above the canard which induces some favorable lift on the canard, reducing the canard angle-of-attack and its lift-induced drag.

Shock Cancellation

Referring now to FIG. 6, there is shown a two-dimensional shock-free environment, corresponding to a model developed by Busemann in 1935, comprising a bi-planar structure 600 exhibiting parallel external surfaces. Busemann's study helped explain how a shock-free environment of parallel surfaces leads to theoretically zero wave drag (due to volume) through shock cancellation. With the Busemann biplane structure 600 at zero incidence, as shown in FIG. 6, shocks produced at the leading edges are canceled by expansions at the shoulders of the opposite surfaces. The expansion waves are then canceled by shocks at the trailing edges. The result is negligible wave drag, no sonic boom, and no lift. As the incidence angle is increased in order to produce lift, an undesirable shock is produced off the lower surface. The Busemann bi-planar structure 600 is therefore impractical for a lift producing "Low Boom" supersonic aircraft. However, the Busemann structure 600 can be incorporated on the aircraft to cancel shocks off "non-lift producing" structure such as engine nacelles.

Referring now to FIGS. 7A through 7C, shock cancellation shroud 702 is incorporated around the engine nacelles 704 with trailing edge portion of wing 706 incorporating a reflexed portion R above engine nacelle 704. Reflexed portion R of wing 706 includes an upward bend in both the lower and upper surfaces of wing 706. FIGS. 7A and 7B show a cross-section of a trailing edge portion of wing 706 along the aircraft longitudinal axis. The inlet of engine nacelle 704 is mounted below wing 706 and slightly aft of reflexed portion R of wing 706. Arrow A indicates the direction of air flow over wing 706. FIG. 7B shows a cross-section of an embodiment of shock cancellation shroud 702 that extends around only a front portion of nacelle 704. FIG. 7C shows a front view of shock cancellation shroud 702 around engine nacelle 704 below wing 706. During supersonic flight, expansions at the leading edge of shock cancellation shroud 702 cancel shock wave expansions generated at nacelle inlet 708. The dimensions of shock cancellation shroud can be selected to optimally cancel expansions from nacelle 704.

The reflexed portion R of wing 706 beyond the minimum drag amount to further reduce the nacelle shock can be of further benefit for area/lift tailoring. For lifting surfaces, such as wing 706, the surface loading is re-optimized for minimum drag in the presence of the impinging pressures from shock waves from the upper portion of nacelle 704, resulting in a slight (generally 6%) increase in loading where compressions increase the local lifting efficiency (due to the higher lift curve slope in the locally lower Mach number). Minimum drag is achieved with one-hundred percent impingement induced load cancellation, which can be achieved by proper positioning of reflexed portion R of wing 706 with respect to engine nacelle 704.

Figure 7D:
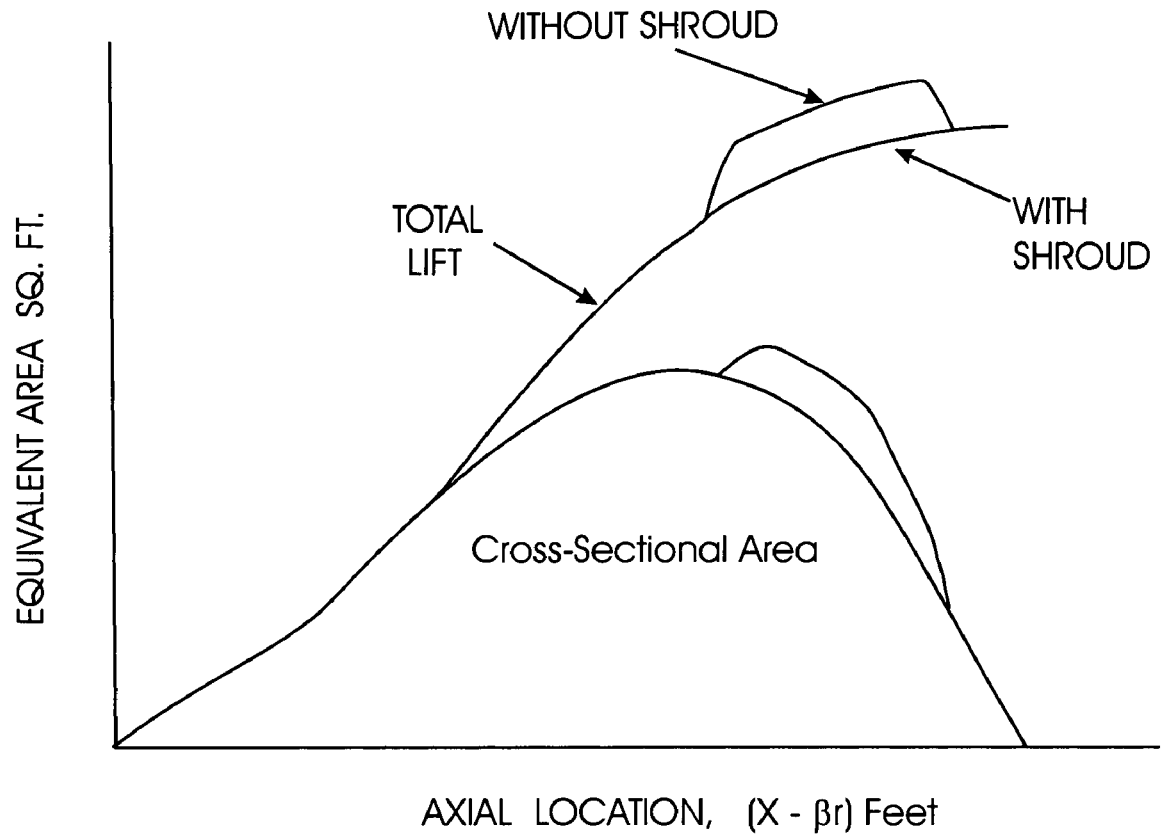
FIG. 7D is a graph showing equivalent area distribution with and without an engine nacelle shock cancellation shroud for sonic boom shock reduction.
Figure 7E:
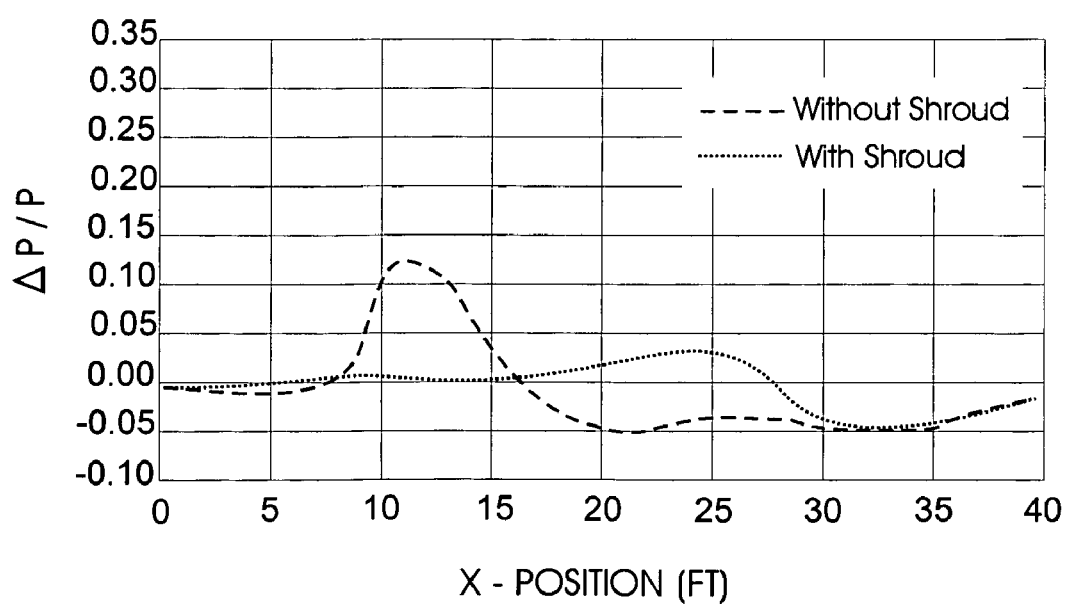
FIG. 7E shows change in pressure versus aircraft fuselage station for aircraft with and without an engine nacelle shock cancellation shroud for sonic boom shock reduction.

Referring to FIGS. 7B and 7C, FIG. 7C shows equivalent area of aircraft 200 (FIG. 2C) with and without shock cancellation shrouds 702 and wing-body tailoring. The rate of change of equivalent area shows a discontinuity at the location of engine nacelles 704, however, shock cancellation shrouds 702 substantially reduce the discontinuity in the tailored area/lift distribution. FIG. 7D shows pressure distributions with and without shock cancellation shroud 702. Shock strength is greatly reduced and the shock location moves farther aft with shock cancellation shroud 702 and reflexed wing 706 (FIG. 7B), compared to nacelle 704 without shock cancellation shroud 702 or wing-body tailoring.

Contrary to prior art, nacelle pressure disturbances are not well approximated by axisymmetric flow solutions. This is because all production inlets are connected to their aircraft by diverters or pylons and are often not circular, especially for engines buried within the aircraft structure. Adding a diverter or pylon in the channel between an aircraft and an inlet greatly alters the impinging pressures, typically doubling pressures in the channel between the aircraft and inlet/nacelle and completely canceling pressures elsewhere. By using the actual inlet/nacelle, aircraft and interconnecting geometry, the actual nacelle impingement pressure on the aircraft can be calculated. The optimal aircraft camber slope of reflexed portion R can then be determined.

A solution for such geometry can be calculated using any method with at least second-order accuracy, like full-potential and Euler CFD methods that can represent the actual shapes. The effect of a viscous boundary layer on impingement pressure, while generally smaller in magnitude, also improves the impingement pressure calculation and can be used for final geometry definitions. For lifting surfaces, the surface loading is re-optimized for minimum drag in the presence of the impinging pressures, resulting in a slight (generally 6%) increase in loading where compressions increase the local lifting efficiency (due to the higher lift curve slope in the locally lower Mach number). Minimum drag is achieved with 100 percent impingement induced load cancellation. The resulting reflexed camber slopes have much larger slope changes near the nacelle/diverter and barely discernible slope changes away from the nacelle, in contrast with prior art designs.

Figure 8A:
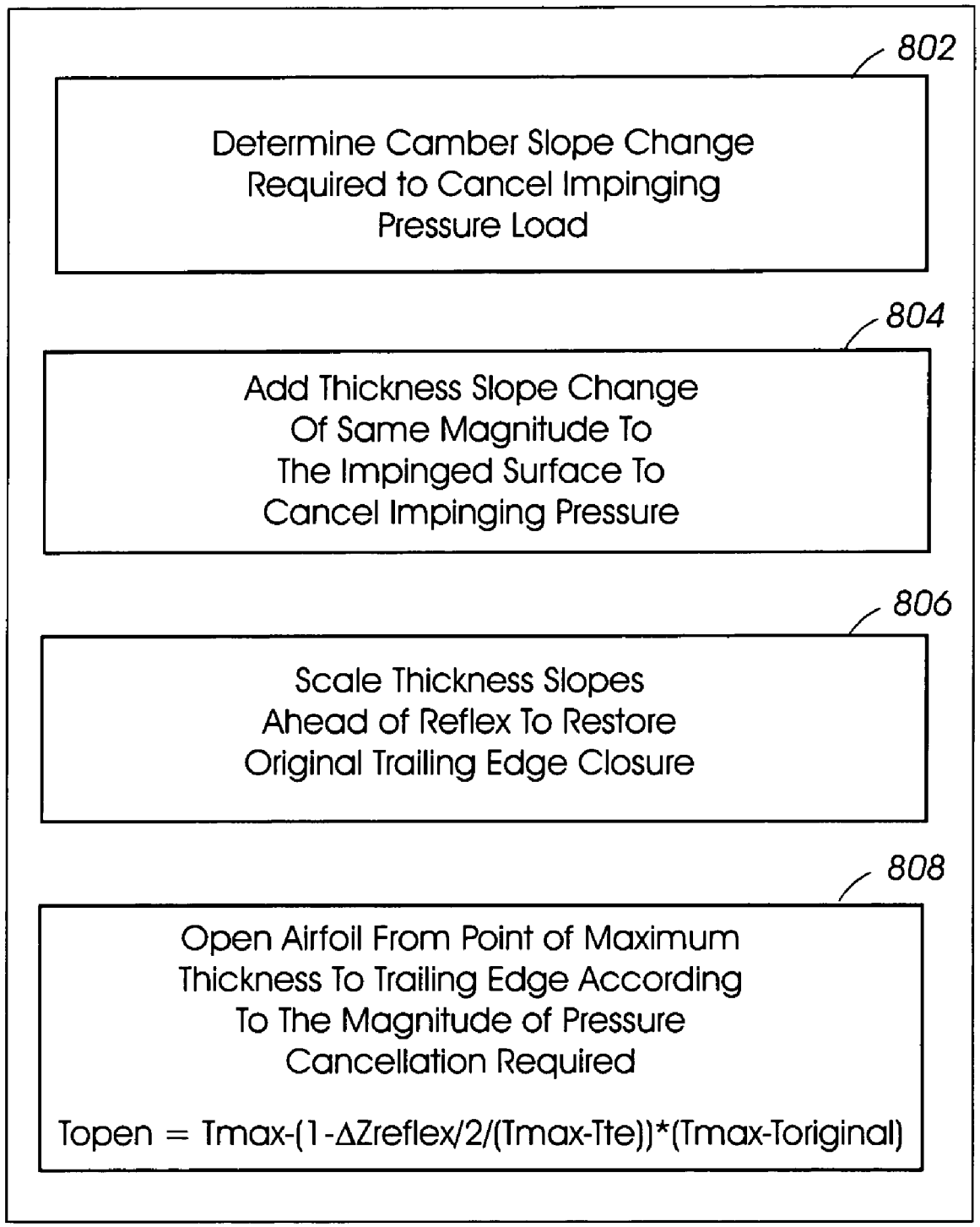
FIG. 8A shows a flow diagram of a process for designing the reflexed portion of an airflow section.
Figure 8B:
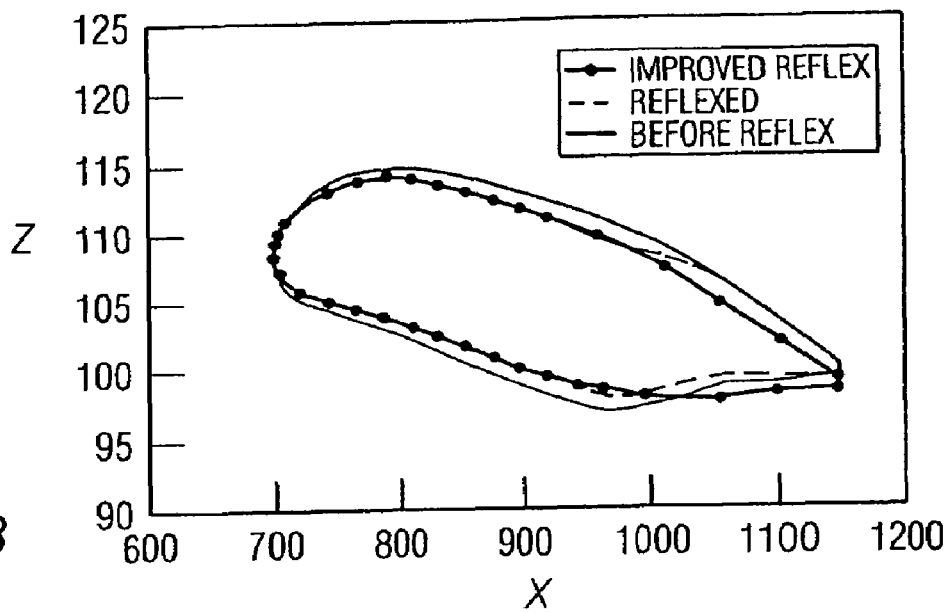
FIG. 8B shows cross sectional wing shapes for an improved reflex design in accordance with an embodiment of the present invention.

Referring now to FIG. 8A, a set of processes 802-808 for designing an improved reflexed portion of an airflow section are shown. To illustrate processes 802-808, FIG. 8B shows (with an expanded Z-axis scale) cross sectional wing shapes for an improved reflex design in comparison with a non-reflexed design and reflex R shown in FIGS. 7A and 7B. FIGS. 8D-8F illustrate airfoil pressure coefficient profiles for the non-reflexed, reflexed and improved reflex designs, respectively.

Figure 8C:
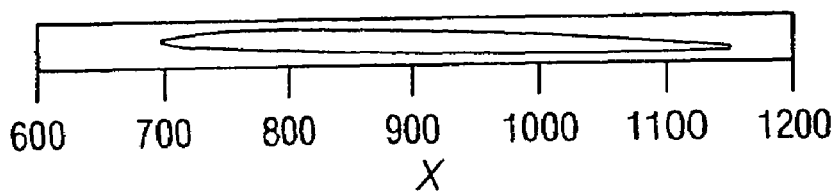
FIG. 8C shows the thickness slope change of an airfoil section with improved reflex design.
Figure 8D:
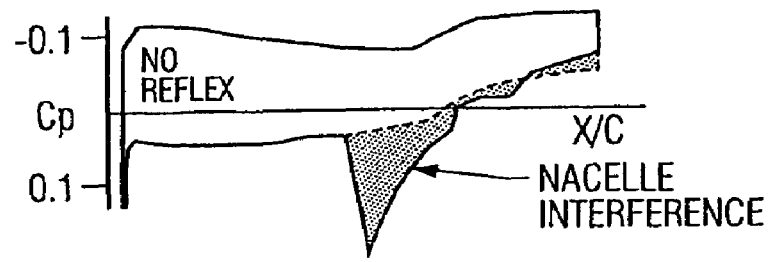
FIGS. 8D-8F illustrate airfoil pressure coefficient profiles for the non-reflexed, reflexed and improved reflex designs, respectively.
Figure 8E:
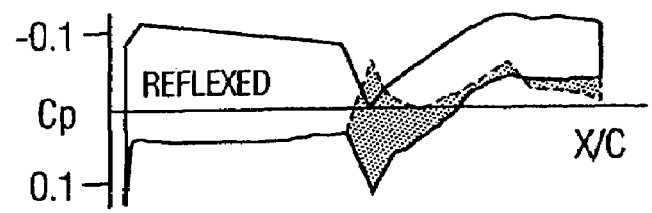
Figure 8F:
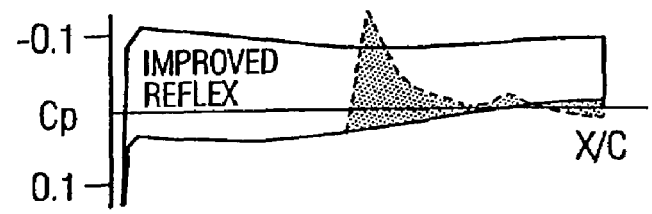

The improved reflex cross sectional wing shape shown in FIGS. 8B and 8C includes a reflexed airfoil and pressure distribution near the nacelle/diverter. The airfoil cross section is shown in FIG. 8B with an exaggerated thickness scale so the addition of thickness to the improved reflex shape can be more easily seen. The non-exaggerated thickness shown in FIG. 8C shows that the slope change is perhaps more abrupt but of a magnitude similar to supercritical airfoils. The reflexed pressure distribution in FIGS. 8E and 8F show how the minimum drag load, prior to the nacelle interference, has been achieved in the presence of the nacelle-induced pressure. In the reflex shown in FIG. 8E, a bump and corresponding compression on the upper airfoil surface is created, while the impinging compression on the lower surface is only halved.

To avoid disturbances on the opposite surface of a reflexed surface, the surface thickness can be modified along with the camber slope change. The term "thickness slope" is defined herein as the rate of change in the half-thickness of the airfoil versus chord. Once the camber slope change needed to cancel the impinging pressure load is determined in process 802 (FIG. 8A), a thickness slope change of the same magnitude is also added to the impinged surface—canceling substantially all of the impinging pressure disturbance in process 804. Camber slope changes alter the impinged surface and opposite surface with the same slope change. On the other hand, thickness slope changes alter the opposite surface slope by the same absolute magnitude but with the opposite sign—canceling the reflex on the opposite surface. Making the thickness slope change the same as the camber slope change doubles the reflex on the impinged surface and cancels out completely on the opposite surface, restoring the original opposite surface shape.

However, when the thickness is reflexed, the trailing edge closure is generally compromised because the impinging pressure usually has more compression than expansion. To counter this problem, the thickness slopes ahead of the reflex can be scaled-up by a common factor such that the original trailing edge closure is restored in process 806. Since the thickness reflex and scale-up do not alter the camber, the optimum loading for minimum drag can be maintained for the camber-only reflex. The thickness reflex and scale-up also keeps the structural thickness from being compromised where it is critical for supporting the propulsion system weight. Further, as shown in FIG. 8F, the addition of the thickness reflex causes the entire inlet/nacelle impinging pressure to be cancelled, instead of just half-cancellation with the camber-only reflex shown in FIG. 8E.

In practice, scaling-up thickness ahead of the reflex may not be practical because the thickness increase required may be as much as 140%, which generally increases drag more than desired. An increase in thickness to no greater than the rest of the wing (since there is not much structural benefit for increasing more than the rest of the wing versus an increasing drag penalty) combined with opening the airfoil results in a much more optimum structural/aerodynamic trade-off. Because the nacelle interference pressures cancel much of the wing wave drag behind the wing maximum thickness, somewhat (typically 10-30%) thicker airfoil sections near the nacelle have been determined to be more optimal from structural/aerodynamic trade studies.

Figure 9A:
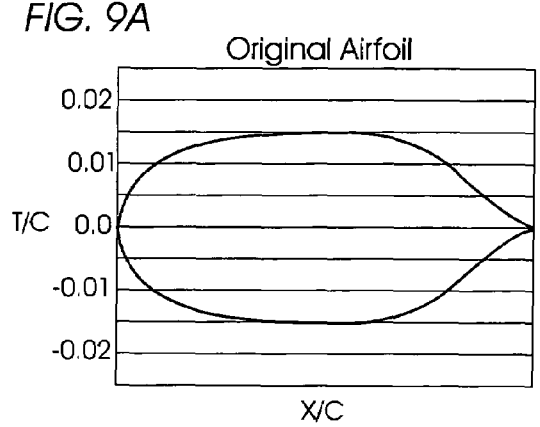
FIGS. 9A-9F show airfoil sections with improved reflex as a result of the airfoil opening process of FIG. 8A.
Figure 9B:
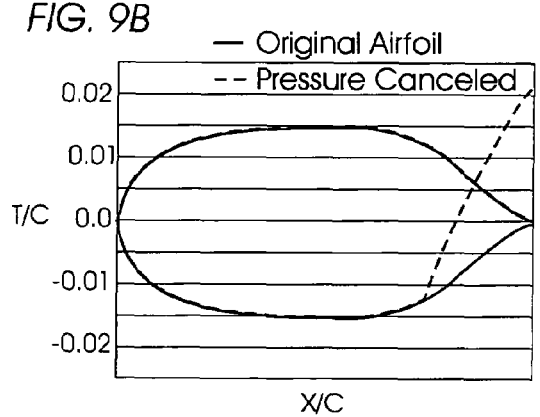
Figure 9C:
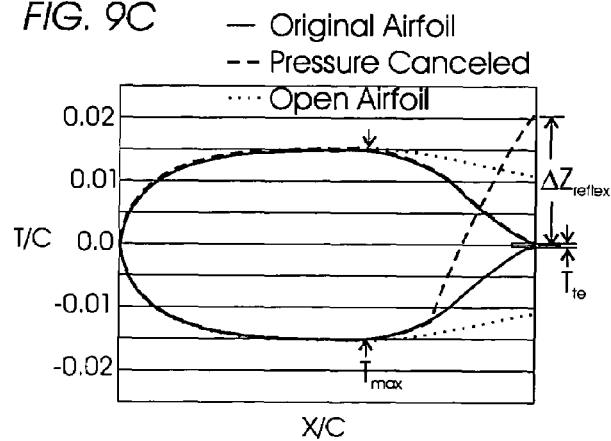

FIGS. 9A-9H show a series of changes that can be made during the design of an airfoil section using an airfoil opening process for improved reflex. FIG. 9A shows a sample original supersonic wing airfoil with non-zero trailing edge thickness (shown with an exaggerated thickness scale (T/C) and flat camber line for clarity). In FIG. 9B the dashed airfoil represents the change necessary to completely cancel the interference pressure due to a nacelle mounted on an airfoil lower surface behind the maximum thickness of the airfoil. FIG. 9C shows the airfoil opening process. To create a closed airfoil that includes the pressure cancellation, the airfoil is opened, from its maximum thickness to its trailing edge, by the magnitude of the pressure cancellation in process 808, according to the diagram in FIG. 9C and the formula below:

$$T(x)_{open} = T_{max} - (1 - \Delta Z_{reflex}/2/(T_{max} - T_{te}))*(T_{max} - T(x)_{original})$$

where: $T_{max}$=the maximum thickness of the airfoil section;
$\Delta Z_{reflex}$=the change in surface slope required to cancel impinging pressure;
$T_{te}$=the thickness of the airfoil section at the trailing edge; and
$T(x)_{original}$=thickness of original airfoil.

Figure 9D:
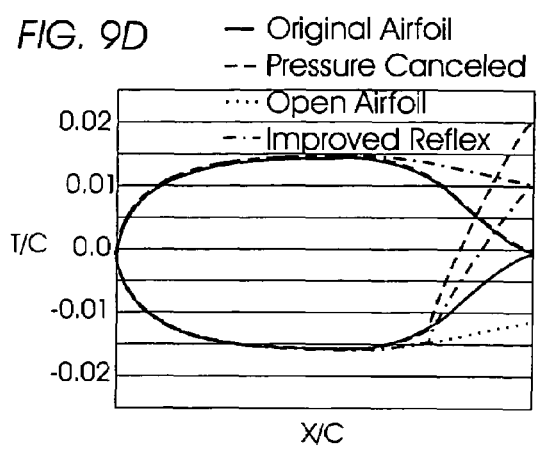
Figure 9E:
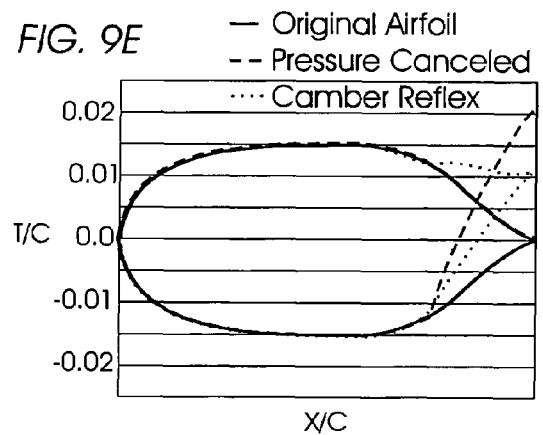

Note that the airfoil opening process 808 is performed first, and then the combined camber and thickness improved reflex added to achieve a closed airfoil with improved reflex as shown in FIG. 9D. The camber/thickness slope required to cancel the pressure disturbance is applied to the surface of the opened airfoil being impinged by the pressure disturbance, creating the final improved reflex. In comparison, the camber reflex of the airfoil section of FIGS. 7A-7B is shown in FIG. 9E to highlight that the camber reflex is just half of the total combined camber and thickness reflex.

Figure 9F:
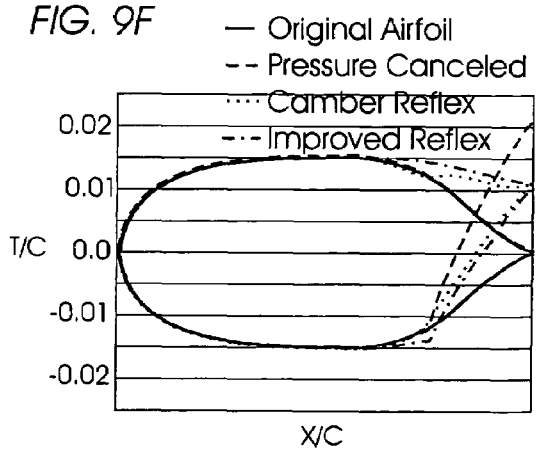

Additionally, using the camber reflex alone creates a disturbance above the wing equal to half of the impinging pressure cancelled below the wing. FIG. 9F shows the improved reflex by airfoil opening with the camber reflex. Note that the improved reflex upper surface is the same fixed, smooth airfoil opened shape, eliminating the disturbance on the upper surface of the camber reflex. In addition because a full reflex is applied to the opened airfoil, the full impinging pressure is cancelled. Moreover, the airfoil opening process results in an airfoil section where pressures are increased smoothly overall.

Figure 9G:
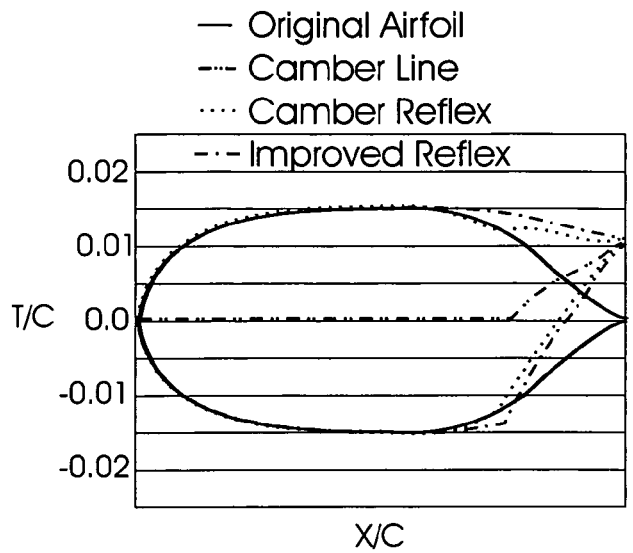
FIG. 9G shows the camber line in common for airfoil sections with camber reflex and improved reflex configurations.
Figure 9H:
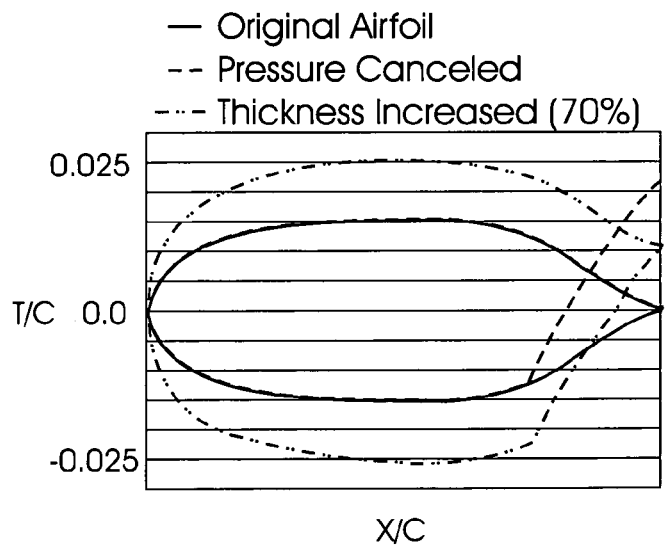
FIG. 9H shows an example of an airfoil section with improved reflex by thickness increase only requiring a 70% increase in thickness for this same reflex case of FIGS. 9B-9G.
Figure 9I:
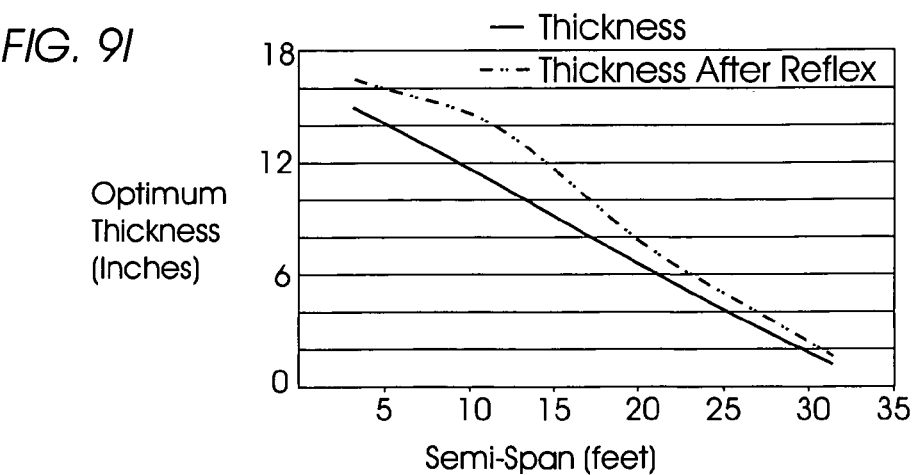
FIG. 9I is a graph showing a comparison example of an optimized thickness distribution of an airfoil section versus semi-span with a thickness re-optimized in the improved reflex region, resulting in an increase in the improved reflex region optimum thickness.

The smoother pressures above and below the airfoil result in lower drag and sonic boom disturbance. Further, FIG. 9G shows how the improved reflex and camber reflex share the same camber line, so the pre-reflex load distribution is maintained. The increased impinging pressure on the improved reflex greatly reduces drag; in fact, the fraction of airfoil opening equals the fraction of the airfoil closure wave drag that has been cancelled by the impinging pressure. Because so much of the wave drag can be reduced with reflexing, somewhat thicker airfoil sections where impinging pressure can cancel wave drag may be used. FIG. 9H shows improved reflex by thickness increase only. Generally, a smaller portion of airfoil closure is optimally achieved through thickness increase, the majority can be better achieved using the airfoil opening process 808 in conjunction with processes 802, 804, and/or 806. FIG. 9I compares a thickness distribution versus semi-span with a thickness re-optimized for improved reflex region thickness increase.

Except for the changes described in the opening airfoil processes 802-808, the reflex may otherwise be calculated using standard aerodynamic design methods or even wind tunnel measurements. This combined camber and thickness reflex can be calculated from the difference between the pressures with the inlet/nacelle and without. The camber slope reflex is the change in camber calculated to cancel the load from the difference between the solutions.

Any method, such as inverse vortex lattice singularity or iterative CFD, can be used to find the change in camber slope that cancels the load. The addition of a thickness reflex equal to the camber reflex has the effect of only modifying the impinged surface (except for thickness and opening scale-up effects) and can also be calculated by only modifying the impinged surface (twice as much) instead of the camber slopes. The loading for minimum drag can be calculated in the presence of both the impinging pressure and the thickness reflex to account for the aforementioned optimum load changes due to the local Mach number. The reflex shape can also be arrived at through iterative CFD shape optimization for minimum drag. However, because drag gradients are harder to resolve than normal force, the calculation takes much longer and does not typically resolve the reflex shape as accurately as directly removing/reducing the impinging pressure.

Calculating the flow-field around an inlet/nacelle and any impinged surfaces can be complex. This is especially true if multiple inlet/nacelle locations are to be compared. An efficient alternative to calculating the difference between the pressures with the inlet/nacelle and without is by approximating the impinged surfaces with a no-flow, streamwise boundary condition, typically a plane to mimic wings or tails. The no-flow boundary can be a streamwise cylinder to mimic a fuselage as an impingement surface. Superimposing the pressures at desired locations, on simplified solutions without the inlet/nacelle, allows rapid inlet/nacelle placement studies from this single inlet/nacelle boundary solution. The reflex can also be refined later from an exact, full-configuration solution, resulting in small additional improvements. Alternately, these improvements to reflexing technology can be extended to reduce drag in the presence of other strong pressure disturbances such as canopies, stores, joined structures, etc.

Figure 9J:
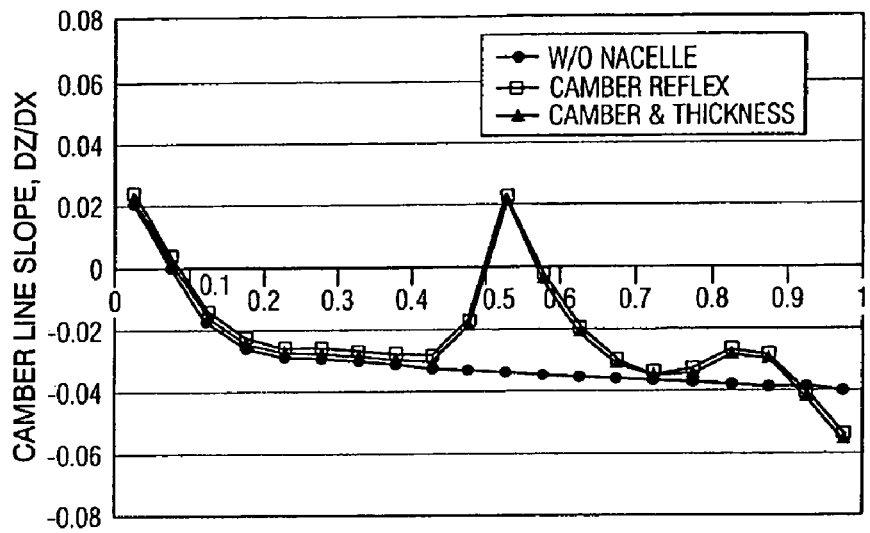
FIG. 9J shows an example of the camber line slope change needed to cancel one-half of the propulsion induced pressure disturbance.
Figure 9K:
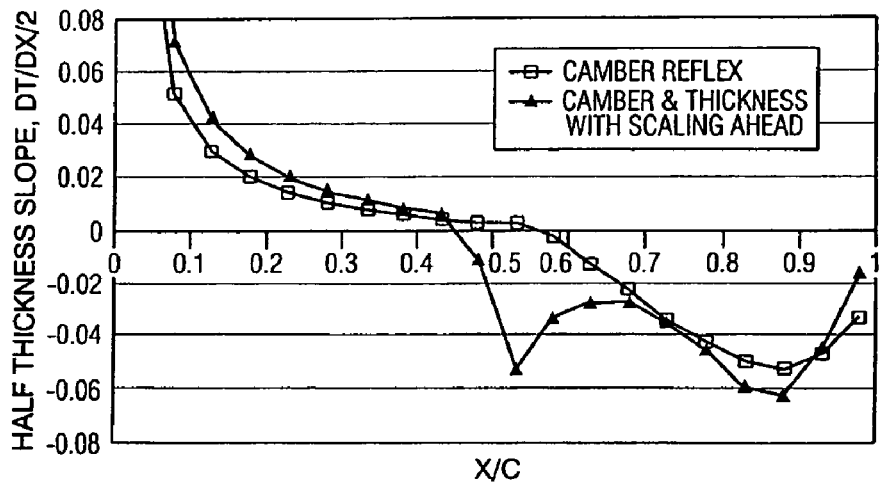
FIG. 9K shows an example of the improved reflex with a corresponding half-thickness slope change.
Figure 9L:
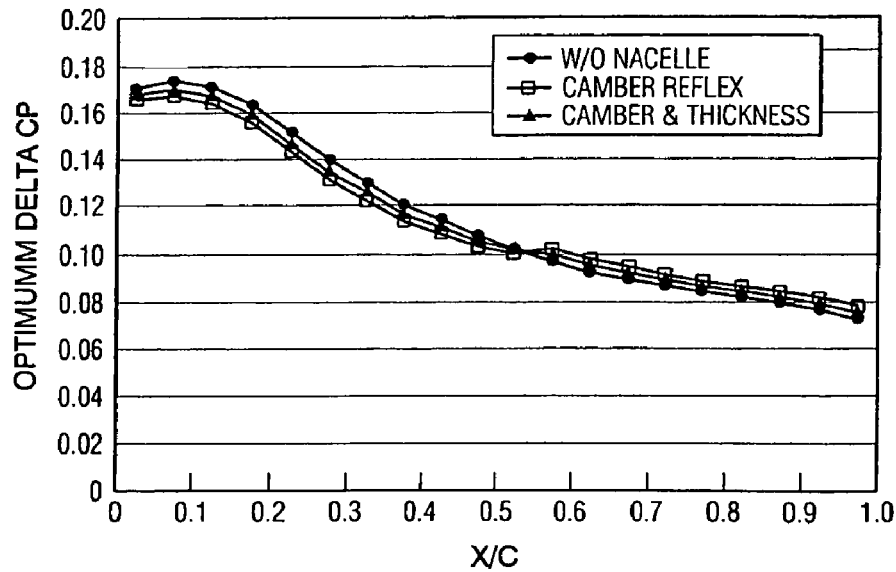
FIG. 9L shows a graph of an example of an optimum change in pressure for an airfoil section without a nacelle, with camber reflex only, and with camber and thickness (improved) reflex configurations, showing the reflex regions as having increased load carrying efficiency.

FIG. 9J shows the camber line slope change needed to cancel one-half of the propulsion induced pressure disturbance. Since such a camber line change causes an equivalent pressure change on the airfoil's other surface, the induced pressure load is fully cancelled. FIG. 9K shows the how the improved reflex has a corresponding half-thickness slope change. The small difference in camber slope for the improved reflex is the result of a second-order optimization that slightly changes the optimum loading (in the presence of impinging pressures due to volume, propulsion nacelle and wing thickness in this case.) FIG. 9L shows a graph of an example of an optimum change in pressure for an airfoil section without a nacelle, with camber reflex only, and with camber and thickness (improved) reflex configurations.

Figure 9M:
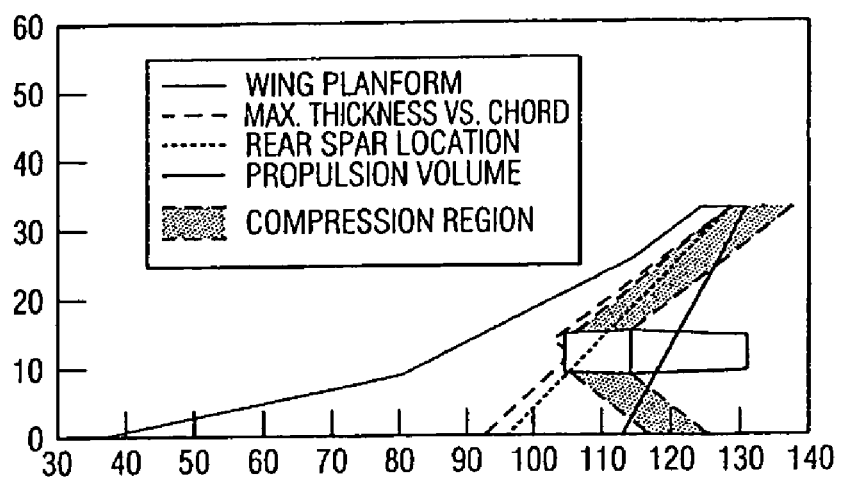
FIG. 9M shows an example of how a typical planform can be defined such that the maximum thickness is kept ahead of the nacelle compression region.
Figure 9N:
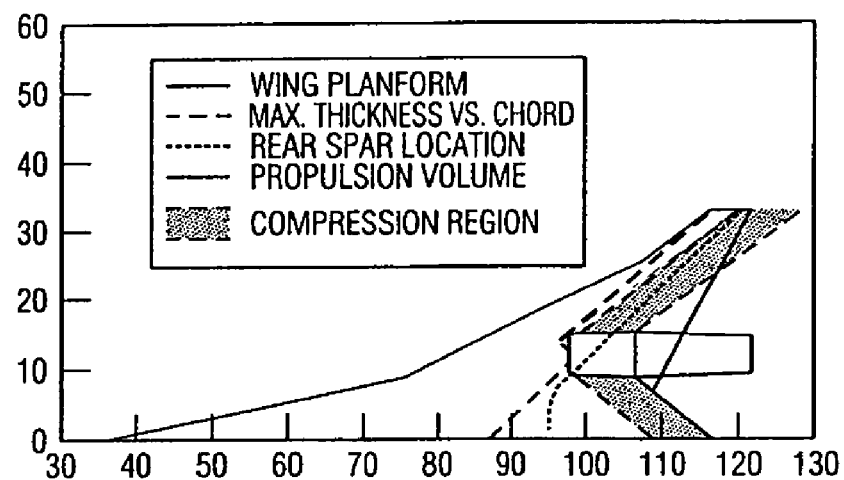
FIG. 9N shows another example of how a typical planform can be defined such that the maximum thickness is kept ahead of the nacelle compression region adding a high negative trailing edge sweep near the wing root that follows the compression region back.

FIGS. 9M and 9N show how a planform can be shaped to achieve the greatest beneficial interference from a compression disturbance source mounted on the aft chordwise portion of a surface, like a wing. The wing thickness reflex procedure previously described allows the rear spar depth to be maintained by increasing depth ahead of (thickness increase) or by increasing depth in (airfoil opening) the compression region (instead of carving out depth in the compression region). FIG. 9M shows how a typical planform can be defined such that the maximum thickness is kept ahead of the nacelle compression region. Notice that almost the entire region behind the wing maximum thickness is impacted by the compression region or is covered by the propulsion system, even though the trailing edge sweep is far less than the compression shock angle. This coverage by the propulsion system and compression region impingement substantially reduces the largest source of wing wave drag. The lower trailing edge sweep allows the compression on both sides of the nacelle to be exploited with a lower rear spar length and sweep, thereby lowering weight. FIG. 9N adds a high negative trailing edge sweep near the wing root that follows the compression region back, allowing even more of the region to be exploited. Further, the aft extension of the root chord unsweeps a constant X/C maximum thickness and allows the inboard rear spar to be unswept, reducing rear spar length, sweep and weight. Higher trailing edge sweep can also be used to follow the outboard shock angle exactly if a bracing-tail was used to help support the wing because of the resulting long, highly swept rear spar.

Friction drag is generally around 40% of the total drag, so it is desirable to reduce this drag source as well. Laminar flow boundary layers create the largest known friction drag reductions. At supersonic speeds, significant laminar flow can be achieved under the proper conditions. Surfaces should be very smooth and free from the discontinuities of typical leading edge flap device tolerances. Typical supersonic airfoils, like biconvex and similar shapes with always decreasing thickness slopes, develop strong favorable pressure gradients (going from higher pressure to lower pressure) that are conducive to laminar flow. Additionally, swept surfaces and shock impingements cause cross-flow instabilities that spoil laminar flow, so low sweep surfaces in regions without shock impingements are conducive to laminar flow. Leading edge devices are not required on the braced tail 214 (FIGS. 2A-2C) because the wing downwash limits its angle-of-attack. Additionally, the outboard most portion of the wing can forego a leading edge device and achieve laminar flow. In this way, limited laminar flow can be achieved in combination with the aforementioned wave and induced drag reductions. Since laminar flow becomes more difficult to maintain the longer a surface becomes, the shorter lengths of the bracing tail, fin, outboard wing, inlet and nose can be made to have stronger and more robust favorable pressure gradients. The greater the thickness-to-chord ratio, the more robust the favorable gradient will be. Shorter lengths of laminar flow can thereby be more practically and reliably achieved.

Non-Planar Shock Directionality

For heavier vehicles and higher flight altitudes, the equivalent area due to lift becomes much greater than the area due to vehicle volume. It becomes important to spread-out and properly distribute lift to the meet sonic boom minimization and trim requirements. Three non-planar techniques disclosed herein are:

1. azimuthal redistribution to decrease sonic boom propagating below the vehicle by redirecting it above the vehicle;
2. increasing the effective length that can be used for sonic boom minimization by increasing the height of lifting surfaces toward the aft end of the vehicle;
3. extending or adding a lifting surface at the aft end of the vehicle's effective length, especially mounted high, to create the expansion spike required for sonic boom minimization.

For non-planar technique one, aircraft 200 in FIGS. 2A and 2D-2F further incorporate a different area distribution for azimuths above the wing than below, reducing fuselage area more below the wing than above. The side view of aircraft 200 in FIG. 2B shows that the volume of fuselage 212 is reduced to a greater extent below wing 208 than above wing 208. This greater reduction in fuselage volume below the wing results in a reduction in pressure below the wing that reduces lift. However this is mitigated by confining most of the area reduction to near the wing trailing edge, so less of the wing is impinged by the expansion. George-Seebass minimization shows that the reduction in higher pressure under the wing reduces sonic boom shock strength proportionately. Further, the reduction of the fuselage area above the wing now occurs mostly behind the wing as shown in FIG. 2G, reducing the overall equivalent area, further reducing minimized sonic boom. The top plan view of aircraft 200 in FIG. 2A shows that, while the height of fuselage 212 has been flattened, the width can still accommodate the landing gear tires.

Figure 10A:
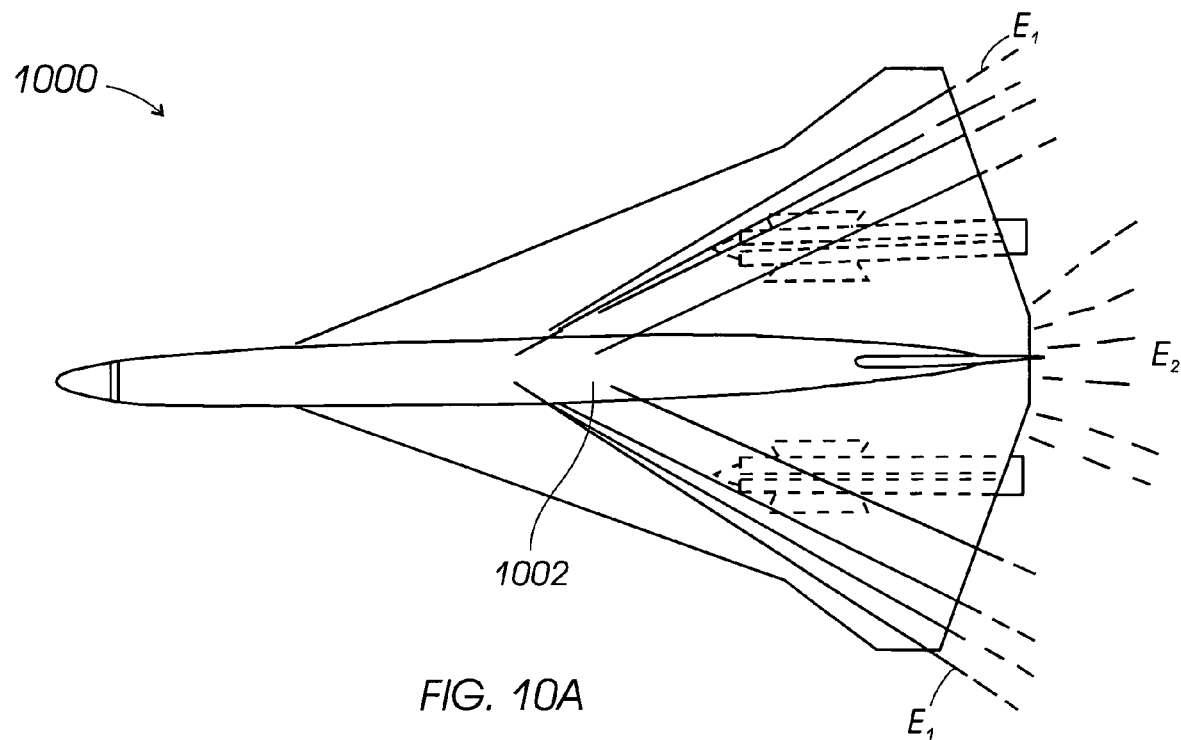
FIGS. 10A and 10B illustrate application of fuselage shaping to tailor a shock expansion to increase lift by reducing pressure above the wings of the aircraft.
Figure 10B:
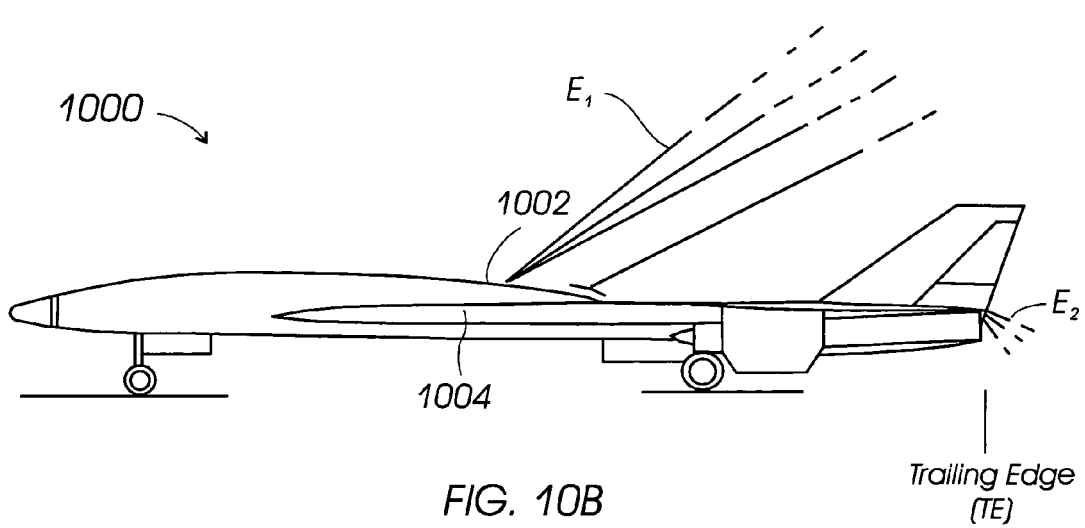

Referring now to FIGS. 10A and 10B, an embodiment of aircraft 1000 incorporates further advantages associated with non-planar shock directionality to reduce shock due to lift by reducing the volume of mid-fuselage 1002 above wing 1004 beyond that needed for wave drag reduction without reducing the volume as much under wing 1004. An airflow expansion $E_1$ generated on sloped portion of mid-fuselage 1002 lowers the pressure above wing 1004 in the area covered by expansion $E_1$. Expansion $E_1$ increases lift without changing the pressure under wing 1004, thereby reducing the angle-of-attack required to generate the same lift, and reducing pressure below wing 1004.

Figures 11A, 11B, 11C:
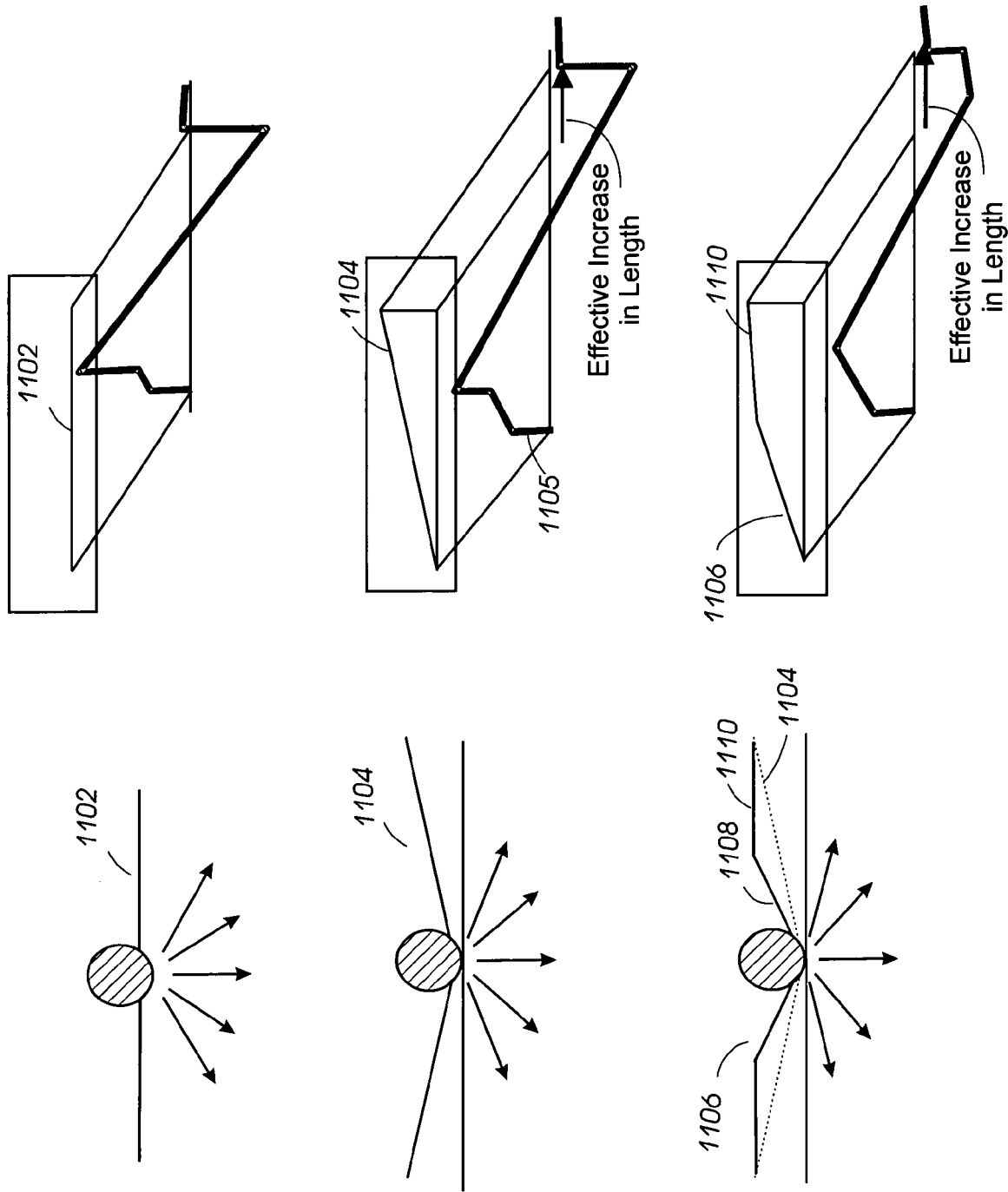
FIGS. 11A-11C show examples of wing dihedral configurations and their effect of increasing the length over which lift is spread and correspondingly reducing the magnitude of lift per foot.

For the second non-planar technique, referring to FIG. 11A through 11C, wing dihedral can be incorporated in aircraft 200 (FIG. 2C) to make it easier to achieve a sonic boom minimized distribution, to reduce the trim drag associated with meeting a sonic boom minimized distribution, and to improve the loudness reduction possible through sonic boom minimization. FIGS. 11A through 11C each show front and side views of wings 1102, 1104, 1106, respectively. With the highly-swept wings common to supersonic aircraft, increasing the dihedral angle effectively lengthens the pressure distribution signature, as shown in a comparison between FIG. 11A and FIG. 11B. The combination of a sweptback wing and dihedral leads to a wing tip that is higher than it would be otherwise. Because of the angle of the shock waves coming off airplane 200, the higher wing tip stretches out the effective length over which the wing pressure disturbance is distributed under aircraft 200. The shock waves are also compressed above aircraft 200, but those shock waves do not generally propagate to the ground. Whatever distance any part of wing 1104 is above the nose of aircraft 200, the lift is that distance times Beta [square root of $(Mach^2-1)$] effectively further behind the nose than its axial distance alone. So carrying lift higher toward the aft end of aircraft 200 is the key to why dihedral of a sweptback wing can help achieve a minimized sonic boom. Aircraft 200 with sonic boom minimized distributions tend to need to have their lift carried further aft than otherwise desired, so having lift effectively further aft for sonic boom, without being actually further aft, can be especially helpful in balancing a vehicle and avoiding increased trim drag. Diffusing the strength of the shock below aircraft 200, as well as stretching the effective length of aircraft 200, further reduces the sonic boom signature on the ground.

FIG. 11A shows a double front shock and N-wave aft shock for wing 1102 with no dihedral. FIG. 11B illustrates the lengthening and corresponding boom strength-reducing effect of dihedral wing 1104 on the ground pressure distribution 1105 from the corresponding aircraft. Sonic boom disturbance is proportional to length and weight of an aircraft, and the sonic boom disturbance is reduced when the pressure changes are stretched along a greater effective aircraft length. Wing dihedral effectively moves lift due to the wing aft, thereby effectively lengthening the aircraft without affecting the aircraft's center of lift for weight and balance purposes.

Adding dihedral angle to a wing typically has an adverse effect on rolling moment due to sideslip. Designers are therefore limited in the amount of dihedral angle that can be utilized. FIG. 11C shows an embodiment of a refined gull dihedral wing 1106 that includes an inboard dihedral 1108, and less dihedral or even anhedral on an outboard portion 1110. Wing 1106 allows a greater dihedral angle to be used than otherwise possible due to the countering effect from the greater moment arm of the outboard portion 1110 of wing 1106. The reduction in outboard dihedral reduces the tendency to roll while side-slipping, or allows a higher inboard dihedral with the same roll tendency. An anhedral outboard portion 1110 can increase lift and reduce drag in ground effect due to the wing tip being closer to the ground. Outboard portion 1110 can also have a different sweep angle than the inboard portion of wing 1106. The gull wing 1106 places more lift higher than dihedral wing 1104 in FIG. 11B, and therefore places more lift aft to meet a sonic boom minimized distribution without it being aft for trim.

The combination of gull dihedral wing 1106 (FIG. 11C) and reduced volume mid-fuselage combine non-planar lift benefits, thereby decreasing the pressure shock strength and stretching the lift aft, easing constraints required to tailor the area/lift distribution on the aircraft.

Figure 11D:
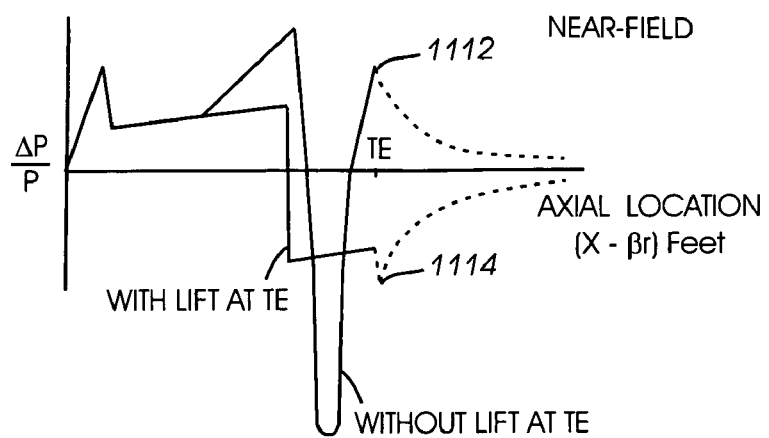
FIG. 11D shows near vehicle aft shock expansion spike generated by an expansion wave that occurs off the trailing edge of the wing only with lift at the trailing edge of the wing.
Figure 11E:
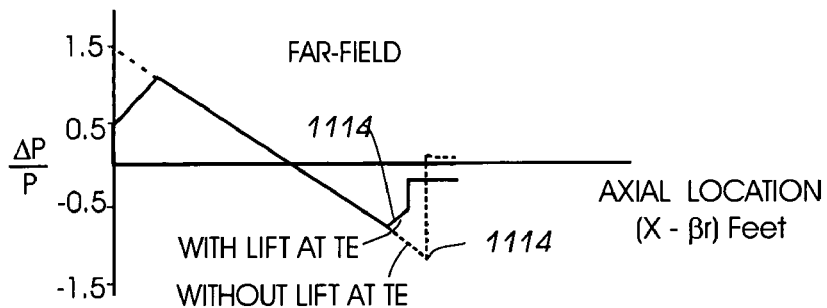
FIG. 11E shows an example of a lift per foot distribution curve with aft shock strength reduction at the ground due to expansion spike generated by an expansion wave that occurs off the trailing edge of wing only with lift at the trailing edge of the wing.

Regarding the third non-planar technique, FIGS. 11D-11G illustrate the effects of reducing aft shock spike 1114 at the trailing edge (TE) of the aircraft, as shown in the near field pressure distribution of FIG. 11D and the resulting far field pressure distribution shown in FIG. 11E. Aft shock spike 1114 is generated by a shock wave that occurs off the trailing edge of wing 1104. It is desirable to carry lower pressure above wing 1104 relative to below wing 1104 to the trailing edge of wing 1104 to generate an expansion $E_2$ that reduces or even prevents aft shock coalescence behind the trailing edge of wing 1104. The far field shock disturbances for the aircraft can be reduced by aft expansions, for example, by at least 6 to 15 perceived level decibels (PLdB) and/or from an aft shock strength of 1.4 psf (overpressure change of −1.3 to 0.1) to an aft shock strength of 0.5 psf (overpressure change of −0.7 to −0.2) as shown in FIG. 11E.

Figure 11F:
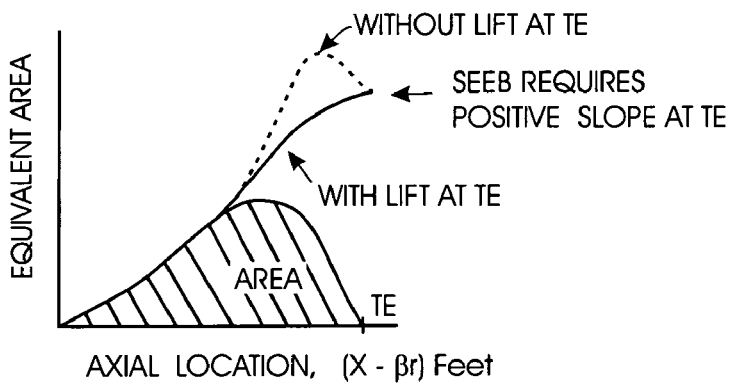
FIG. 11F shows lift per foot distribution curve of FIG. 11E integrated into equivalent area and superimposed on an equivalent area distribution from the aircraft of FIG. 10A with and without trailing edge lift.

In one embodiment of the aircraft that implements the third non-planar technique, wing 1104 of the aircraft extends near the trailing edge of the aircraft. To prevent aft shock coalescence, FIG. 11F shows equivalent area distributions for the aircraft for the pressure distributions in FIGS. 11D and 11E with and without trailing edge lift. Note the substantial reduction of aft shock 1114 in the pressure distribution with trailing edge lift. The camber of wing 1104 is designed to carry enough lift near the aft end of the vehicle to generate an equivalent area due to lift with a positive slope at the trailing edge of wing 1104 as shown in FIG. 11F to generate expansion $E_2$ (FIG. 11C) off the trailing edge of wing 1104. Expansion $E_2$ creates the expansion spike needed for George-Seebass minimization from the difference in air pressure between the upper and lower side of wing 1104. Moving the center of lift aft also maximizes the effective aircraft length that can be used for area/lift tailoring, which also provides the benefit of reducing the strength of sonic boom shocks.

Another method of generating expansion $E_2$ is to design a portion of the trailing edge of wing 1104 in a cambered, slightly downward position to generate expansion $E_2$. Other suitable techniques for generating expansion $E_2$ at the trailing edge of wing 1104 can be utilized.

Figure 11G:
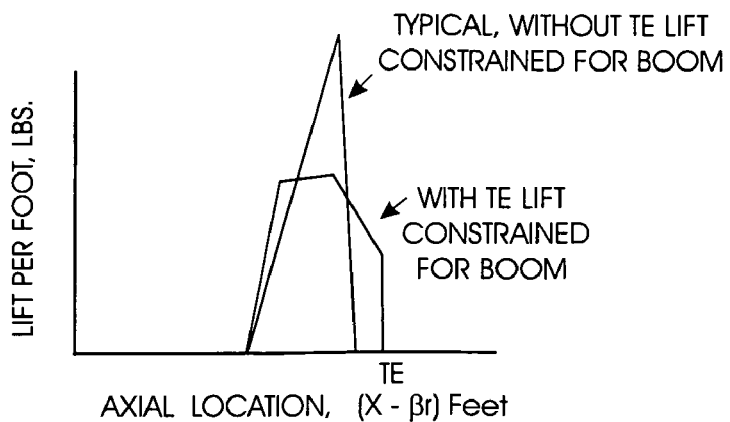
FIG. 11G shows lift per foot distribution for the aircraft of FIG. 10A with and without trailing edge lift.

FIG. 11G shows the lift per foot in pounds versus axial location on the aircraft designed with and without lift carried at the trailing edge of wing 1104. When lift is carried to the trailing edge of wing 1104, lift per foot rises to a certain level and remains substantially lifting to the trailing edge of wing 1104. In contrast, a typical lift per foot rises to a peak and then reduces to zero upon reaching the trailing edge of a wing, thereby generating a positive pressure spike that results in the aforementioned greater aft shock strength at the ground of 1.4 psf shock strength.

Figure 12:
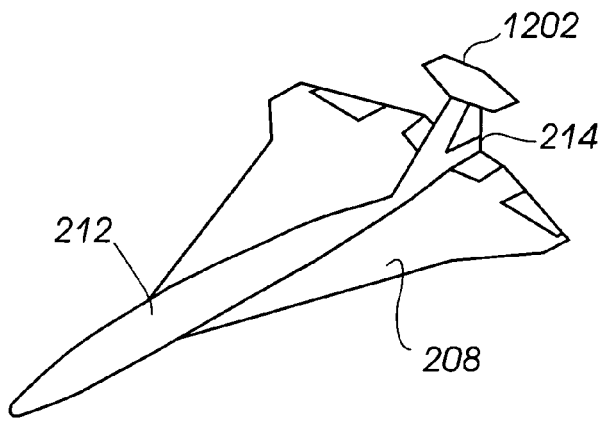
FIG. 12 shows an embodiment of an aircraft with a high, aft lifting surface on the tail to carry additional lift to the trailing edge of the aircraft.

A method of combining the benefits of placing lift high toward the aft end of an aircraft and getting the aft expansion spike for sonic boom minimization from trailing edge lift can include using a high-mounted, aft, lifting tail 1202, as shown in FIG. 12. As discussed previously for dihedral and gull wings 1104, 1106 (FIGS. 11B and 11C), tail 1202 increases the effective lifting length and allows the lift to be carried effectively aft for sonic boom minimization while not actually being aft for balance. A sonic boom minimized lift/area distribution can be efficiently achieved by configuring tail 1202 to achieve the lift needed for sonic boom minimization and properly cambering the trailing edge of tail 1202 to produce exactly the expansion spike size needed. In some embodiments, tail 1202 is positioned as high as practical. However, the farther behind wing 208 tail 1202 is placed, the greater the amount of lift tail 1202 needs to carry. Tail 1202 can be placed closely behind or even overlapping the aft end of the wing's effective lift, since tail 1202 is in the wing downwash and may create greater drag for the same amount of lift.

Figure 13A:
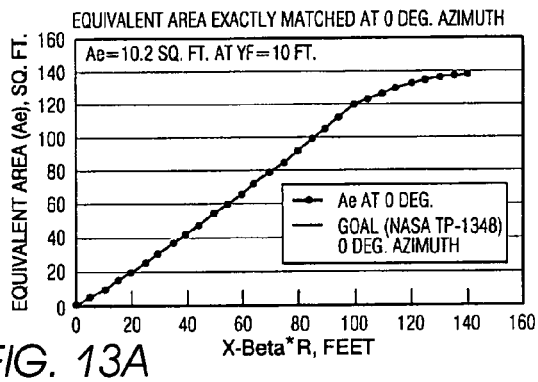
FIGS. 13A, 13B, and 13C show examples of graphs of equivalent area with corresponding ground overpressure at zero and 20 degrees of azimuth.
Figure 13B:
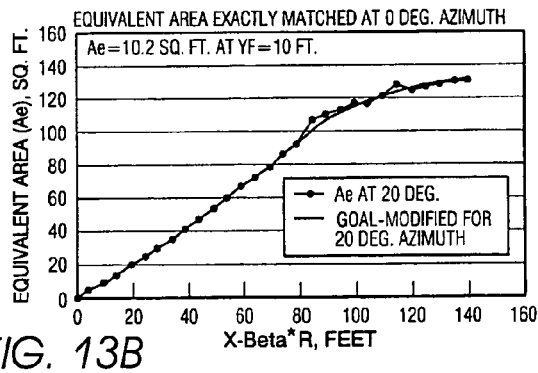

As stated earlier, traditionally, it was believed that sonic boom minimization required following the Seebass-George-Darden ideal equivalent area distribution curve. However, embodiments disclosed here show that sonic boom minimization can still be achieved if the equivalent area distribution curve of the aircraft configuration includes excursions below the ideal equivalent area distribution curve. The equivalent area distribution of the aircraft need only be equal to or less than the equivalent area goal distribution to achieve minimized sonic boom at the ground. Rather large equivalent area excursions can be tolerated if they are below the minimized distribution. For example, FIG. 13A shows a comparison of propagation between a minimized (goal) equivalent area: with excursions above the goal area and with excursions below the goal area. The propagations are plotted times the square root of distance over the square root of altitude to keep the pressure magnitude more constant for ease of comparison. The goal propagation FIG. 13B) yields a minimum shock ground signature with 0.4 psf front and rear shock strengths. The propagation with excursions above the goal area (FIG. 13C) translates into an initial pressure at a distance of 30 feet with an additional large compression starting at 40 msec followed by an similar strength expansion at 45 msec and another compression at 55 msec followed by an similar expansion at 60 msec. The feet to msec conversion is nearly 2 to 1 at Mach 2.0. Due to the physics of propagation, the compression at 40 msec propagates faster, coalescing the entire front of the signature and doubling shock strength.

To the contrary, the propagation with excursions below the goal area (FIG. 13D) translates into an initial pressure at a distance of 30 feet with expansions followed by similar strength compressions at the same locations as the previous case. This time the physics of the propagation cause the expansions followed by compressions to interact and cancel during propagation. At the ground, the tiny disturbance left is insignificant in loudness. Very strong compressions can therefore be cancelled if they are preceded by a similar size expansion. This similarity for cancellation is apparent on an equivalent area plot as short excursions below the goal distribution that then come back up to the goal further back on the vehicle.

The application of this flexible minimization is at least threefold. Prediction and design clearance uncertainty can be allowed for by excursions below the equivalent area where appropriate. Also, the minimum drag area distribution does not have to be completely compromised to meet the equivalent area goal exactly. Excursions below can be allowed simply to reduce drag. Further, more than one minimization constraint can be met by allowing excursions below. For example, a shortcoming of the Seebass, George, Darden theory is that it only describes minimization directly below the aircraft. FIG. 13A illustrates a vehicle that exactly matches the goal minimization area directly under the aircraft (0 degrees azimuth). As is the case for lift and non-axisymmetric area, when the Mach angle is changed to look at 20 degrees azimuth equivalent area, the distribution has changed. In this case, the wing mounted nacelle on the near side shifts forward, resulting in two excursions above the minimized distribution, FIG. 13C. The excursion above the goal at 20 degrees azimuth leads to front shock coalescence and an increase in loudness of 10 dBA, FIG. 13E. By simply reducing the Mach angle area at 20 degrees azimuth until the area is everywhere below the goal, both azimuth's minimization requirements can be simultaneously met. Zero degrees azimuth now is compromised with excursions only below the minimization goal, FIG. 13B, and 20 degrees azimuth also retains some prior slight excursions below, FIG. 13D. The ground signature for the compromised redesign that meets both minimization conditions has the same loudness at 0 degrees azimuth and similarly low loudness at 20 degrees, FIG. 13F.

Figure 13C:
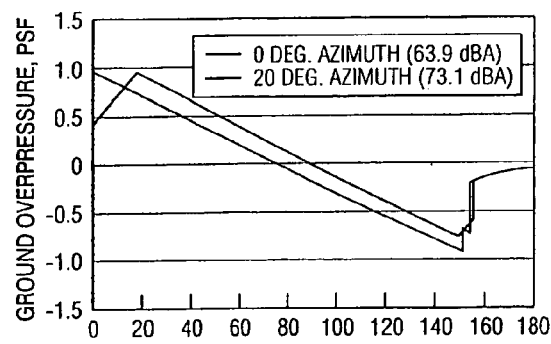
Figure 13D:
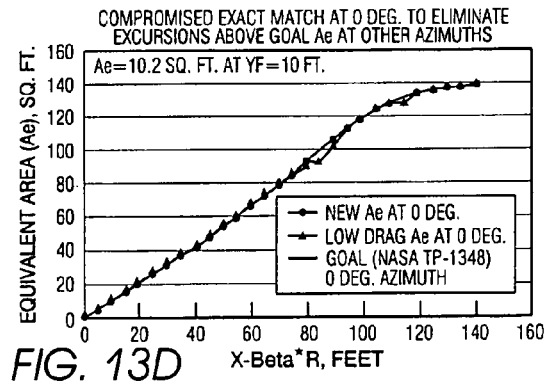
FIGS. 13D, 13E, and 13F show examples of graphs of equivalent area with corresponding ground overpressure at zero and 20 degrees of azimuth, when the goal matching at zero degrees is compromised by excursions below the goal at zero degrees so that no excursions above the goal at 20 degrees remain, yielding minimized boom at both azimuths simultaneously, plus a slight further excursion below the goals just to reduce drag, still yielding minimized boom at both azimuths.
Figure 13E:
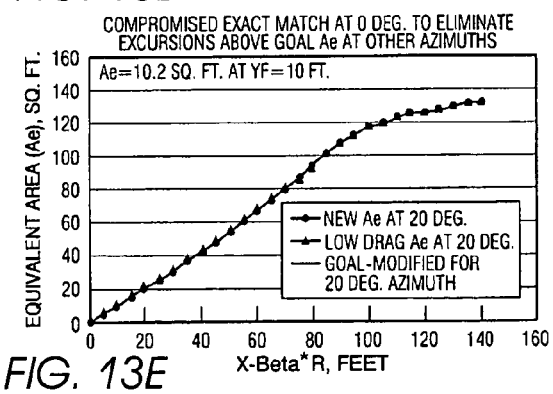
Figure 13F:
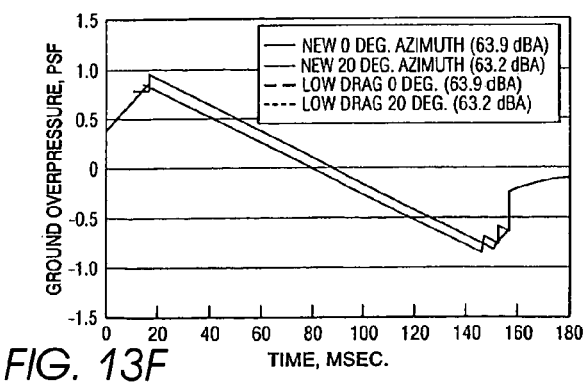

Further, an area reducing smoothing of the previous area reduction was also applied to the design to lower drag, FIGS. 13C and 13D, resulting in ground signatures and loudness identical to the previous result that met both constraints, FIG. 13F. Extending this example, the entire carpet of the aircraft can be minimized by specifying minimization goals every 10 degrees until cut-off and modifying the area distribution until only excursions below remain. Moreover, different flight conditions can be simultaneously considered. Climb minimization goals every 0.2 in Mach number can be added. Maneuver conditions of 1.1 g (or more) turns and pull-ups can also be simultaneously considered for their incremental effect and areas modified until only excursions below sonic boom minimization distributions remain. A minimum shock shape can be considered for a 1.1 g turn and a part ramp/part flat-top signature can be simultaneously applied at the 1.0 g condition to reduce maximum overpressure for reduced building response. In summary, the entire flight envelope can be minimized.

Conventional theory of sonic boom minimization considers Mach angle area distributions in only one dimension of length. To reduce the minimized sonic boom further, the weight must be reduced or the minimization length increased. Since minimized area distributions only have increasing area slopes, the minimization length ends where the lift ends. A tail-braced wing design uses non-planar geometry to maximize the lifting length, and thereby, the minimization length.

FIG. 14A is a schematic front view of a tail-braced dihedral wing aircraft 1400. FIG. 14B illustrates non-planar low sonic boom advantages for the aircraft 1400 of FIG. 14A. FIG. 14C is a schematic front view of a planar wing aircraft 1402. FIG. 14D illustrates a much louder shaped sonic boom profile for the planar wing aircraft 1402 of FIGS. 14C. FIGS. 14A and B schematically illustrates how the bracing tail of the dihedral aircraft 1440 carries lift at a higher elevation, which is equivalent to a much longer minimization length for the pressures propagating below the aircraft. Further, the lift carried by the bracing tail to the trailing edge of the vehicle, creates a lower pressure on the upper surface of the tail that causes the expansion behind the vehicle needed to meet a sonic boom minimized pressure distribution's aft expansion spike. Additionally, carrying the lift at a higher elevation makes the lift appear farther back for sonic boom propagating below the vehicle (X-BetaR) without moving the center-of-pressure (lift) farther back, allowing trim and sonic boom requirements to be more easily met.

Combining one or more of the foregoing techniques for reducing sonic boom disturbances alleviates constraints in designing an aircraft to minimize rates of change in cross-sectional area. The resulting flexibility provides designers with a wider range of choices for configuring an aircraft to reduce sonic boom disturbance.

Those skilled in the art will appreciate that various adoptions and modifications of embodiments of the invention as described above can be configured without departing from the scope of the claims. Therefore, it is to be understood that within the scope of the appended claims, the invention may be practiced other than as specifically described herein.

I claim:

1. A supersonic cruise aircraft comprising:
   a body; and
   a lifting surface mounted on the body, wherein
      the lifting surface includes a trailing edge and a cross-section with a point of maximum thickness between an upper surface and a lower surface,
      the upper surface is fixed with a substantially planar surface from the point of maximum thickness to the trailing edge, and
      the lower surface includes a reflex portion extending from the point of maximum thickness to the trailing edge, and
   further wherein the aircraft is configured according to a lengthwise lift/area distribution curve that enables the aircraft to produce a shaped sonic boom in accordance with a minimized equivalent area distribution curve.

2. The aircraft of claim 1, wherein the lift/area distribution curve undergoes excursions below but not above the shaped sonic boom minimized equivalent area distribution curve.

3. The aircraft of claim 1, further comprising additional sonic boom minimized distributions for azimuths other than directly below the aircraft, for other Mach numbers and other load factors that are simultaneously met by allowing excursions below, but not above, the minimized equivalent area distribution curve.

4. The aircraft of claim 1, wherein the body is a fuselage and the lifting surface includes at least one of the group consisting of the fuselage, a wing, a fin, and a bracing tail.

5. The aircraft of claim 4, wherein lift from the bracing tail creates lower pressure on its upper surface and an expansion at its trailing edge to meet an aft expansion spike of the shaped sonic boom minimized equivalent area distribution curve.

6. The aircraft of claim 1, wherein the aircraft includes a nose defined by a Sears-Haack distribution curve that creates a favorable pressure gradient that produces a reduced drag, laminar boundary layer on the nose of the aircraft, and laminar flow on the fin, an engine nacelle, and outboard low sweep surfaces.

7. The aircraft of claim 1, wherein the aircraft includes a nose that creates a linearly decreasing, favorable pressure gradient area distribution curve that produces a reduced drag, laminar boundary layer on the nose of the aircraft.

8. The aircraft of claim 1, wherein the aircraft includes a blunt nose defining a camber line slope that increases to generate a rapid expansion behind the blunt nose to contribute to the shaped sonic boom minimized equivalent area distribution curve.

9. The aircraft of claim 1, wherein said shaped sonic boom minimized equivalent area distribution curve is achieved with a canard mounted on a nose of the aircraft, wherein the canard is swept less than the Mach cone angle and nose bluntness is halved by being below the canard.

10. The aircraft of claim 1, wherein the body is configured with an area distribution that is reduced in a rearward direction to a greater extent below a wing lifting surface than above the wing lift surface.

11. The aircraft of claim 10, wherein the body greater rearward area reduction below the wing occurs mostly near the trailing edge of the wing root causing a smaller expansion region on the wing underside and corresponding smaller lift reduction.

12. The aircraft of claim 1, further comprising:
   the body includes a relaxed bluntness nose, a fuselage, a wing including a trailing edge, and an engine nacelle mounted below the wing, wherein the body portion is configured with an area/lift distribution tailored to reduce sonic boom disturbance; and a propulsion system capable of generating a non-axisymmetric pressure disturbance that impacts lift and/or trim surfaces, wherein the lift and/or trim surfaces include camber line and thickness slopes configured to define the reflex portion that cancels more than half of the pressure disturbance.

13. The aircraft of claim 12, wherein the wing is a gull dihedral wing configured to carry lifting force at the trailing edge of the wing to create an expansion at the trailing edge of the wing that reduces aft sonic boom ground shock strength.

14. The aircraft of claim 12 further comprising an engine nacelle and an engine inlet at the front of the engine nacelle, wherein the inlet is positioned aft of the reflex portion of the wing.

15. The aircraft of claim 12, further comprising a tail with a lifting surface coupled to the body, wherein the tail lifting surface has a maximum thickness located ahead of the supersonic pressure disturbance.

16. The aircraft of claim 12, wherein an upper surface of the reflex portion is configured in a fixed open shape, wherein the open shape corresponds to the upper and lower surfaces of the wing being opened to the maximum thickness of the wing, and the lower surface of the wing is configured with the reflex portion that starts at the maximum thickness and meets the upper surface at the trailing edge of the wing.

17. The aircraft of claim 12, wherein thickness slopes ahead of the reflex portion can be scaled by a factor to retain an original trailing edge closure thickness.

18. The aircraft of claim 12 wherein the wing is a gull dihedral wing that includes an outboard wing portion without dihedral.

19. The aircraft of claim 18 wherein the gull dihedral wing comprises an anhedral outboard wing portion.

20. The aircraft of claim 12, wherein the lift and/or trim surfaces define a thickness distribution having a slope selected to substantially coincide with the camber line slope.

21. The aircraft of claim 20, wherein the lift surface is a surface of the wing having a maximum thickness located ahead of the supersonic pressure disturbance.

22. The aircraft of claim 1, further comprising:

a fuselage;

a wing;

an engine nacelle; and a high-mounted lifting aft tail, wherein the fuselage and wing are configured according to the lift/area distribution curve including a relaxed bluntness nose that reduces sonic boom disturbance, and the tail is configured to carry lifting force to the trailing edge of the aircraft to create an expansion at the trailing edge of the tail that reduces the aft sonic boom ground shock strength.

23. The aircraft of claim 22 further comprising a fixed upward reflex on a portion of the lower surface of the wing.

24. The aircraft of claim 22 wherein the wing is configured with a gull dihedral.

* * * * *